(12) United States Patent
Liu et al.

(10) Patent No.: US 10,674,535 B2
(45) Date of Patent: Jun. 2, 2020

(54) DEVICE, NETWORK, AND METHOD FOR COMMUNICATIONS WITH OPPORTUNISTIC TRANSMISSION AND RECEPTION

(71) Applicant: Futurewei Technologies, Inc., Plano, TX (US)

(72) Inventors: Jialing Liu, Palatine, IL (US); Weimin Xiao, Hoffman Estates, IL (US); Yuan Xia, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/345,235

(22) Filed: Nov. 7, 2016

(65) Prior Publication Data

US 2017/0142751 A1 May 18, 2017

Related U.S. Application Data

(60) Provisional application No. 62/255,235, filed on Nov. 13, 2015.

(51) Int. Cl.
*H04W 74/00* (2009.01)
*H04W 72/04* (2009.01)
(Continued)

(52) U.S. Cl.
CPC ......... *H04W 74/006* (2013.01); *H04L 5/0044* (2013.01); *H04L 5/0053* (2013.01);
(Continued)

(58) Field of Classification Search
CPC ........... H04W 76/006; H04W 74/0816; H04W 16/14; H04W 84/042; H04L 5/1415; H04L 27/2613
See application file for complete search history.

(56) References Cited

U.S. PATENT DOCUMENTS 9,872,275 B2 * 1/2018 Kalhan .............. H04W 72/005
2014/0086127 A1 * 3/2014 Kim ..................... H04L 5/001
370/311
(Continued)

FOREIGN PATENT DOCUMENTS

CN 104602267 A 5/2015
CN 104798384 A 7/2015
(Continued)

OTHER PUBLICATIONS

Ericsson et al., "Study on Licensed-Assisted Access using LTE," 3GPP TSG RAN Meeting #65, 3GPP Work Item Description, RP-141664, Dec. 9, 2014.
(Continued)

*Primary Examiner* — Rebecca E Song
(74) *Attorney, Agent, or Firm* — Slater Matsil, LLP

(57) ABSTRACT

A system and method of subframe configuration in licensed-assisted access using long-term evolution (LAA-LTE) with carrier aggregation (CA). A wireless device such as an eNodeB (eNB) may transmit control information in a subframe from a secondary cell (SCell) in downlink control information (DCI) to a user equipment (UE). The SCell may operate in an unlicensed band. The control information may indicate at least one of a non-ending subframe in a data burst, an ending subframe, and a duration of the ending subframe. The duration may be one of a predefined number of orthogonal frequency-division multiplexing (OFDM) symbol durations, and the ending subframe may be a partial or full subframe. A partial ending subframe may use a time slot structure in a time division duplexing (TDD) scheme, e.g., downlink pilot time slots (DwPTS). The eNB may then transmit to the UE data in the subframe according to the control information.

27 Claims, 12 Drawing Sheets

(51) Int. Cl.
  *H04L 5/00* (2006.01)
  *H04L 5/14* (2006.01)
  *H04L 27/26* (2006.01)
  *H04W 16/14* (2009.01)
  *H04W 74/08* (2009.01)
  *H04W 84/04* (2009.01)

(52) U.S. Cl.
  CPC .......... *H04L 5/0092* (2013.01); *H04L 5/1415* (2013.01); *H04L 5/1469* (2013.01); *H04L 27/2613* (2013.01); *H04W 16/14* (2013.01); *H04W 72/042* (2013.01); *H04W 74/0816* (2013.01); *H04L 5/001* (2013.01); *H04W 72/0446* (2013.01); *H04W 84/042* (2013.01)

(56) References Cited

U.S. PATENT DOCUMENTS

| | | | |
|---|---|---|---|
| 2014/0133371 | A1 | 5/2014 | Park et al. |
| 2015/0223075 | A1 | 8/2015 | Bashar et al. |
| 2016/0020875 | A1* | 1/2016 | Seo ................ H04L 5/0092 370/280 |
| 2016/0119792 | A1* | 4/2016 | Cheng ................ H04W 52/00 455/454 |
| 2016/0227571 | A1* | 8/2016 | Baek .................. H04W 16/14 |
| 2016/0233989 | A1* | 8/2016 | Belghoul ............ H04L 1/1887 |
| 2016/0338053 | A1* | 11/2016 | Park .................. H04W 74/0808 |
| 2017/0134148 | A1* | 5/2017 | Yerramalli ........... H04L 5/0094 |
| 2017/0142751 | A1* | 5/2017 | Liu .................... H04L 5/1415 |
| 2017/0164384 | A1* | 6/2017 | Wang ................ H04W 72/1289 |
| 2017/0223675 | A1* | 8/2017 | Dinan ................ H04W 72/042 |
| 2017/0223677 | A1* | 8/2017 | Dinan ................ H04W 72/042 |
| 2017/0265248 | A1* | 9/2017 | Narasimha .......... H04W 76/048 |
| 2017/0289818 | A1* | 10/2017 | Ng .................... H04W 16/14 |
| 2017/0325231 | A1* | 11/2017 | Sorrentino ............ H04L 5/001 |
| 2018/0041906 | A1* | 2/2018 | Jang .................... H04W 24/10 |
| 2018/0070244 | A1* | 3/2018 | Wu ..................... H04W 16/14 |
| 2018/0132271 | A1* | 5/2018 | Jung ................... H04W 16/14 |

FOREIGN PATENT DOCUMENTS

| | | |
|---|---|---|
| CN | 104871469 A | 8/2015 |
| CN | 104968052 A | 10/2015 |
| EP | 2923472 A1 | 9/2015 |

OTHER PUBLICATIONS

3GPP, "3rd Generation Partnership Project; Technical Specification Group Radio Access Network; Study on Licensed-Assisted Access to Unlicensed Spectrum; (Release 13)," 3GPP TR 36.889 V13.0.0 Technical Report (Jun. 2015), 87 pages.

ETSI, LTE; Evolved Universal Terrestrial Radio Access (E-UTRA); Physical channels and modulation, 3GGPP TS 136 211 V12.7.0 Technical Specification, Oct. 2015, pp. 1-138.

Alcatel-Lucent Shanghai Bell et al., "Downlink Control Signaling in LAA", 3GPP TSG RAN WG1 Meeting #83, XP051042125, R1-157017, Nov. 15-22, 2015, 6 pages, Anaheim, USA.

Intel Corporation, "On the LAA DL Signalling", 3GPP TSG RAN WG1 Meeting #83, XP051042058, R1-156516, Nov. 15-22, 2015, 4 pages, Anaheim, USA.

Samsung, "LAA Control Signaling Details", 3GPP TSG RAN WG1 #83, XP051022252, R1-156767, Nov. 15-22, 2015, 5 pages, Anaheim, USA.

ETSI EN 301 893 V1.7.1 (Jun. 2012), Harmonized European Standard, Broadband Radio Access Networks (BRAN); 5 GHz high performance RLAN; Harmonized EN covering the essential requirements of article 3.2 of the R&TTE Directive, Jun. 2012, 90 pages.

IEEE Std 802.11-2007 (Revision of IEEE Std. 802.11-1999), IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Computer Society, Sponsered by the Lan/Man Standars Committee, Jun. 12, 2007, 1232 pages.

Huawei et al., "New L1 procedure for small cell on/off transition time further reduction", 3GPP TSG RAN WG1 Meeting #78, R1-142826, Aug. 18-22, 2014, 4 Pages, Dresden, Germany.

\* cited by examiner

DEVICE, NETWORK, AND METHOD FOR COMMUNICATIONS WITH OPPORTUNISTIC TRANSMISSION AND RECEPTION

This patent application claims priority to U.S. Provisional Application No. 62/255,235, filed on Nov. 13, 2015 and entitled "Device, Network, and Method for Communications with Opportunistic Transmission and Reception," which is hereby incorporated by reference herein as if reproduced in its entirety.

TECHNICAL FIELD

The present invention relates generally to managing the allocation of resources in a network, and in particular embodiments, to techniques and mechanisms for a device, network, and method for communications with opportunistic transmission and reception.

BACKGROUND

The amount of wireless data being transferred is expected to exceed that of wired data, pushing the limits of macro cellular deployment. Small cell deployment with higher density and/or with diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity, and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as unlicensed spectrum resources, high-frequency spectrum resources, etc.

SUMMARY OF THE INVENTION

Technical advantages are generally achieved, by embodiments of this disclosure which describe a device, network, and method for communications with opportunistic transmission and reception.

In accordance with an embodiment, a method for subframe configuration in licensed-assisted access using long-term evolution (LAA-LTE) with carrier aggregation (CA) is provided, as may be performed by a user equipment (UE). In this example, the method includes receiving from a secondary cell (SCell), control information in a subframe indicating at least one of a non-ending subframe in a data burst, an ending subframe in the data burst, and a duration of the ending subframe in the data burst. The duration is one of a predefined number of orthogonal frequency-division multiplexing (OFDM) symbol durations. The method further includes receiving data in the subframe according to the control information. An apparatus for performing this method is also provided.

In accordance with another embodiment, a method for subframe configuration in licensed-assisted access using long-term evolution (LAA-LTE) with carrier aggregation (CA) is provides, as may be performed by an eNodeB (eNB). In this example, the method includes transmitting, from a secondary cell (SCell) to a user equipment (UE), control information in a subframe indicating at least one of a non-ending subframe in a data burst, an ending subframe in the data burst, and a duration of the ending subframe in the data burst. The duration is one of a predefined number of orthogonal frequency-division multiplexing (OFDM) symbol durations. The method further includes transmitting, from the SCell to the UE, data in the subframe according to the control information. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In an embodiment, a method of providing discontinuous measurements and transmission in a network includes transmitting, by a controller device to a user equipment (UE), a transmission burst (or a transmission opportunity, i.e., TXOP, a data burst, or a burst, including RS and/or data) whose duration may not be known to the UE a priori; receiving, by the UE, the burst; and processing, by the UE, the burst.

Typically, in a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communication controllers, network controllers, controllers, access points (APs), and so on) may be arranged into a cluster of cells, with each cell having multiple transmit antennas. Additionally, each cell or eNB may serve a number of users (also commonly referred to as User Equipment (UEs), wireless devices, mobile stations, users, subscribers, terminals, and so forth) based on a priority metric, such as fairness, proportional fairness, round robin, and the like, over a period of time. It should be noted that the terms cell, transmission point, and eNB may be used interchangeably hereinafter. Distinctions between cells, transmission points, and eNBs will be made where needed.

Figure 1A:
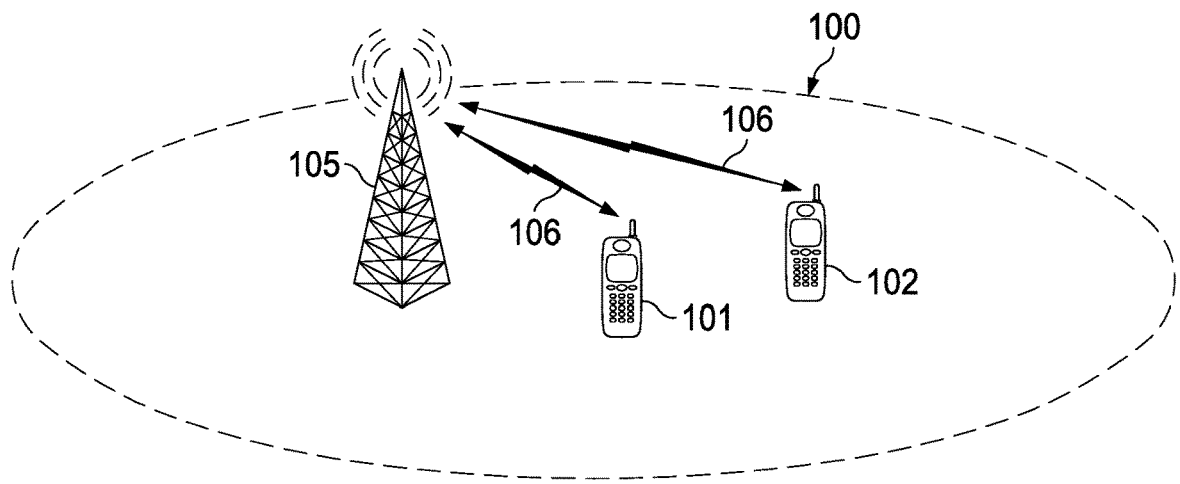
FIG. 1A illustrates a diagram of cellular communications in a macro cell.

FIG. 1A illustrates a network 100 for wireless communications. The network 100 comprises a communication controller 105 and a plurality of wireless devices 101, 102. As shown, the communication controller 105 communicates using a wireless link 106 with a first wireless device 101 and a second wireless device 102. The wireless link 106 may include a single carrier frequency as used typically for a time division duplex (TDD) configuration or a pair of carrier frequencies as used in a frequency division duplex (FDD) configuration. Some of the network elements, such as a backhaul, management entities, etc, used to support the communication controller 105 are not shown in FIG. 1. The transmission/reception from a communication controller to a UE is called downlink (DL) transmission/reception, and the transmission/reception from a UE to a controller is called uplink (UL) transmission/reception. The communication controller 105 may include an antenna, a transmitter, a receiver, a processor, and non-transitory computer readable storage and/or memory. The communication controller 105 may be implemented as or referred to as a transmission point (TP), BS, a base transceiver station (BTS), an AP, an eNB, a network controller, a controller, a base terminal station, and so on. These terms may be used interchangeably throughout this disclosure.

Figure 1B:
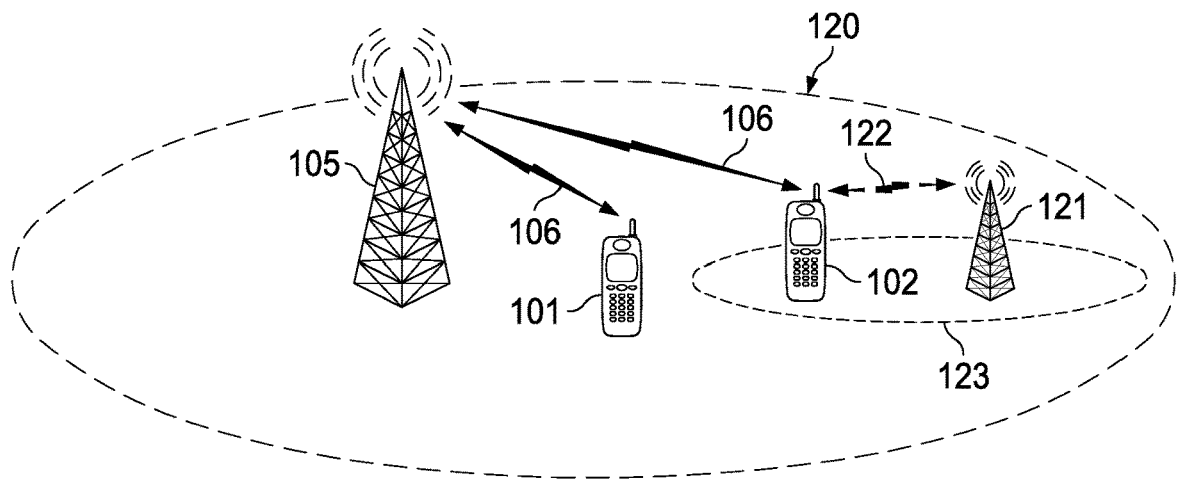
FIG. 1B illustrates a diagram of cellular communications in a heterogeneous network with a macro cell and a pico cell.

As shown in FIG. 1B, system 120 is an example wireless heterogeneous network (HetNet) with communication controller 105 communicating to wireless device 101 using wireless link 106 (solid line) and to wireless device 102 using wireless link 106. A second communication controller 121, such as a pico cell, has a coverage area 123 and is capable of communicating to wireless device 102 using wireless link 122. Typically, wireless link 122 and wireless link 106 use the same carrier frequency, but wireless link 122 and wireless link 106 can use different frequencies. There may be a backhaul (not shown) connecting communication controller 105 and communication controller 121. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces. In an embodiment, a licensed band means that an individual entity pays a licensing fee for the exclusive right to transmit on assigned channels within that band in a given geographic area.

In a network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a network, the points configured for a UE for transmission or reception may include multiple points, some pairs of points may have fast backhaul, but some other pairs of points may have slow backhaul or any backhaul.

In a deployment, an eNodeB may control one or more cells. Multiple remote radio units may be connected to the same base band unit of the eNodeB by fiber cable, and the latency between base band unit and remote radio unit is quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of data transmitted in different cells for the UE can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
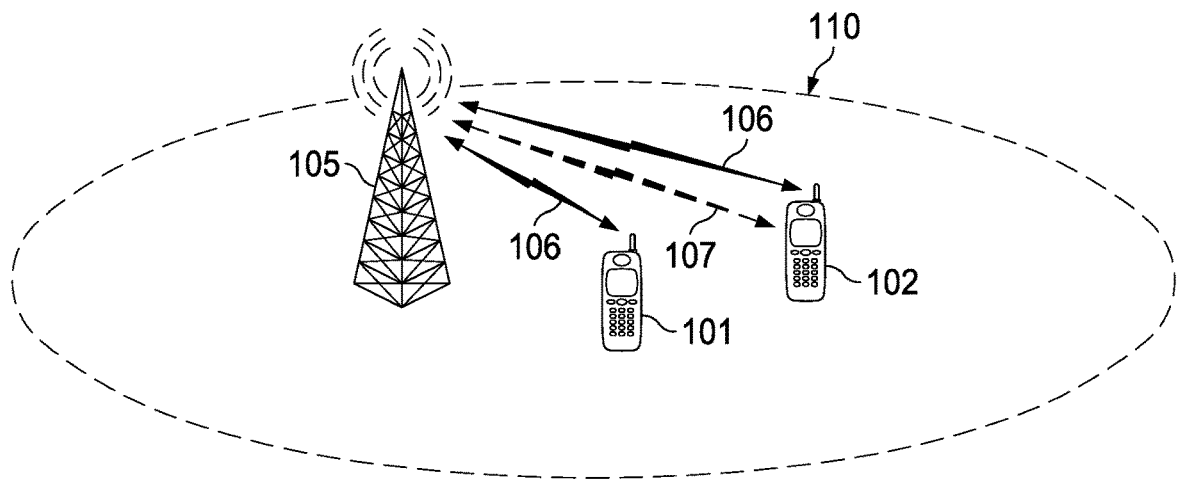
FIG. 1C illustrates a diagram of cellular communications in a macro cell with carrier aggregation.

As shown in FIG. 1C, system 110 is a typical wireless network configured with carrier aggregation (CA) where communication controller 105 communicates to wireless device 101 using wireless link 106 (solid line) and to wireless device 102 using wireless link 107 (dashed line) and wireless link 106. In some embodiment deployments, for wireless device 102, wireless link 106 can be called a primary component carrier (PCC) while wireless link 107 can be called a secondary component carrier (SCC). In some carrier aggregation deployments, the PCC can be provided feedback from a wireless device to a communication controller while the SCC can carry data traffic. In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With CA, one eNB may operate and control several component carriers forming primary cell (PCell) and secondary cell (SCell). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 1D:
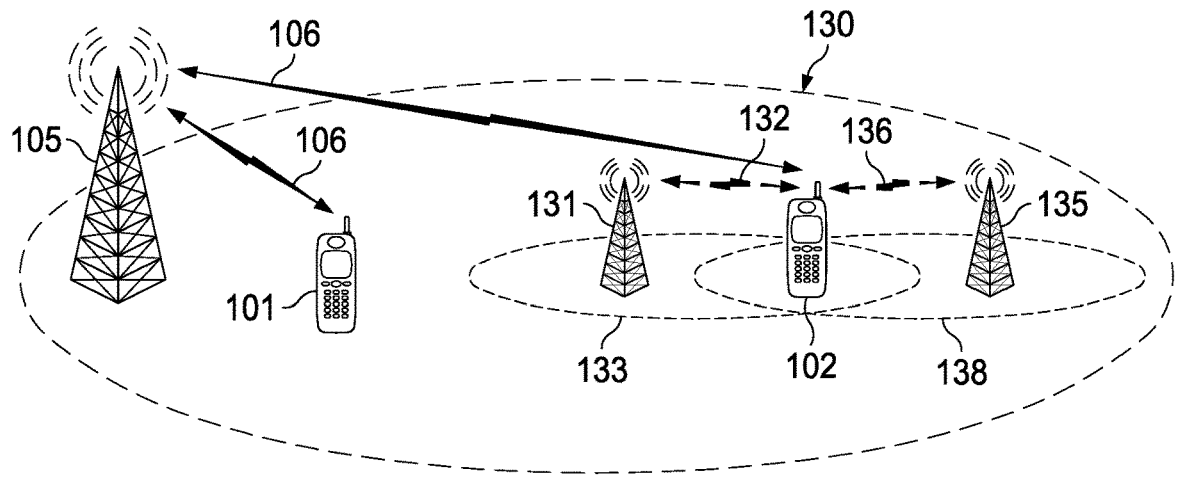
FIG. 1D illustrates a diagram of cellular communications in a heterogeneous network with a macro cell and several small cells.

As shown in FIG. 1D, system 130 is an embodiment wireless heterogeneous network with communication controller 105 communicating to wireless device 101 using wireless link 106 (solid line) and to wireless device 102 using wireless link 106. A second communication controller 131, such as a small cell, has a coverage area 133 and is capable of communicating to wireless device 102 using wireless link 132. A communication controller for another small cell 135 has coverage area 138 and uses wireless link 136. Communication controller 135 is capable of communicating to wireless device 102 using wireless link 136. Coverage areas 133 and 138 may overlap. The carrier frequencies for wireless links 106, 132, and 136 may be the same or may be different.

Figure 1E:
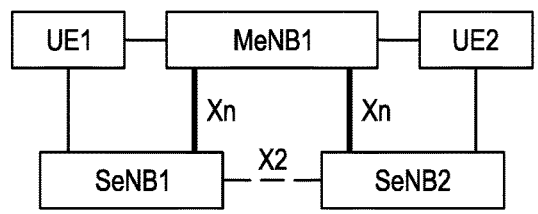
FIG. 1E illustrates a diagram of an embodiment dual connectivity scenario.

FIG. 1E shows an embodiment system configured for dual connectivity. A master eNB (MeNB) is connected to one or more secondary eNBs (SeNBs) using an interface such as the Xn interface (Xn can be X2 in some specific cases). The backhaul can support this interface. Between the SeNBs, there may be an X2 interface. A UE, such as UE1, is connected wirelessly to MeNB1 and SeNB1. A second UE, UE2, can connect wirelessly to MeNB1 and SeNB2.

In orthogonal frequency-division multiplexing (OFDM) systems, the frequency bandwidth is divided into multiple subcarriers in frequency domain. In the time domain, one subframe is divided into multiple OFDM symbols. Each OFDM symbol may have a cyclic prefix to avoid the inter-symbol interference due to multiple path delays. One resource element (RE) is defined by the time-frequency resource within one subcarrier and one OFDM symbol. A reference signal and other signals, such as a data channel, e.g. physical downlink shared channel (PDSCH), and a control channel, e.g. physical downlink control channel (PDCCH), are orthogonal and multiplexed in different resource elements in time-frequency domain. Further, the signals are modulated and mapped into resource elements. For each OFDM symbol, the signals in the frequency domain are transformed into the signals in time domain using, e.g., Fourier transforms, and are transmitted with added cyclic prefix to avoid the inter-symbol interference.

Each resource block (RB) contains a number of REs. FIG. 2A illustrates embodiment OFDM symbols with normal cyclic prefix (CP). There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB, and hence in this example, there are 12×14=168 REs in a RB pair (an RB is 12 subcarriers by the number of symbols in a slot). In each subframe, there are a number of RBs, and the number may depend on the bandwidth (BW).

Figure 2B:
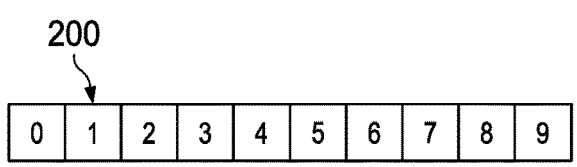
FIG. 2B illustrates a diagram of an embodiment frame structure for a frequency division duplexing (FDD) configuration and a time division duplexing (TDD) configuration.

FIG. 2B shows two frame configurations used in LTE. Frame 200 is typically used for a FDD configuration, where all 10 subframes, labeled 0 through 9, communicate in the same direction (downlink in this example). Each subframe is 1 millisecond in duration and each frame is 10 milliseconds in duration. Frame 210 shows a TDD configuration where certain subframes are allocated for downlink transmissions (such as unshaded boxes (subframes 0 and 5), for uplink transmissions (vertical lines (subframe 2)), and special (dotted box (subframe 1)) which contain both uplink and downlink transmissions. An entire subframe dedicated for downlink (uplink) transmission can be called a downlink (uplink) subframe. Subframe 6 can be either a downlink or a special subframe depending on TDD configuration. Each of the solid shaded boxes (subframes 3, 4, 7, 8, and 9) can be either a downlink subframe or an uplink subframe depending on TDD configuration. The coloring used in frame 210 is exemplary but is based on the standards TS 36.211 Rel. 12, which is hereby incorporated herein by reference.

Figure 2C:
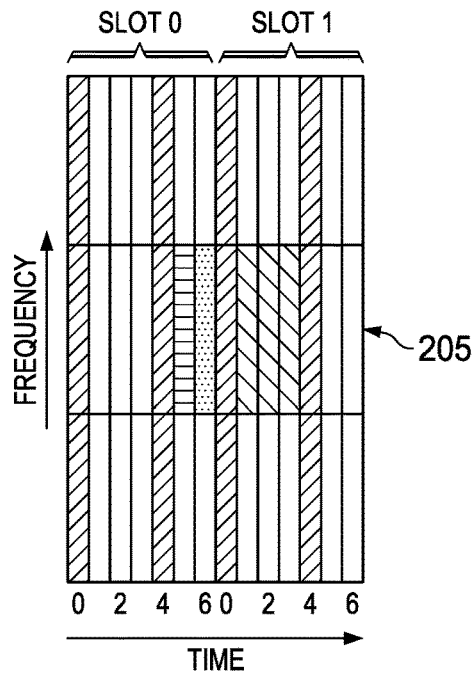
FIG. 2C illustrates a diagram of an embodiment OFDM subframe for FDD configuration.
Figure 2A:
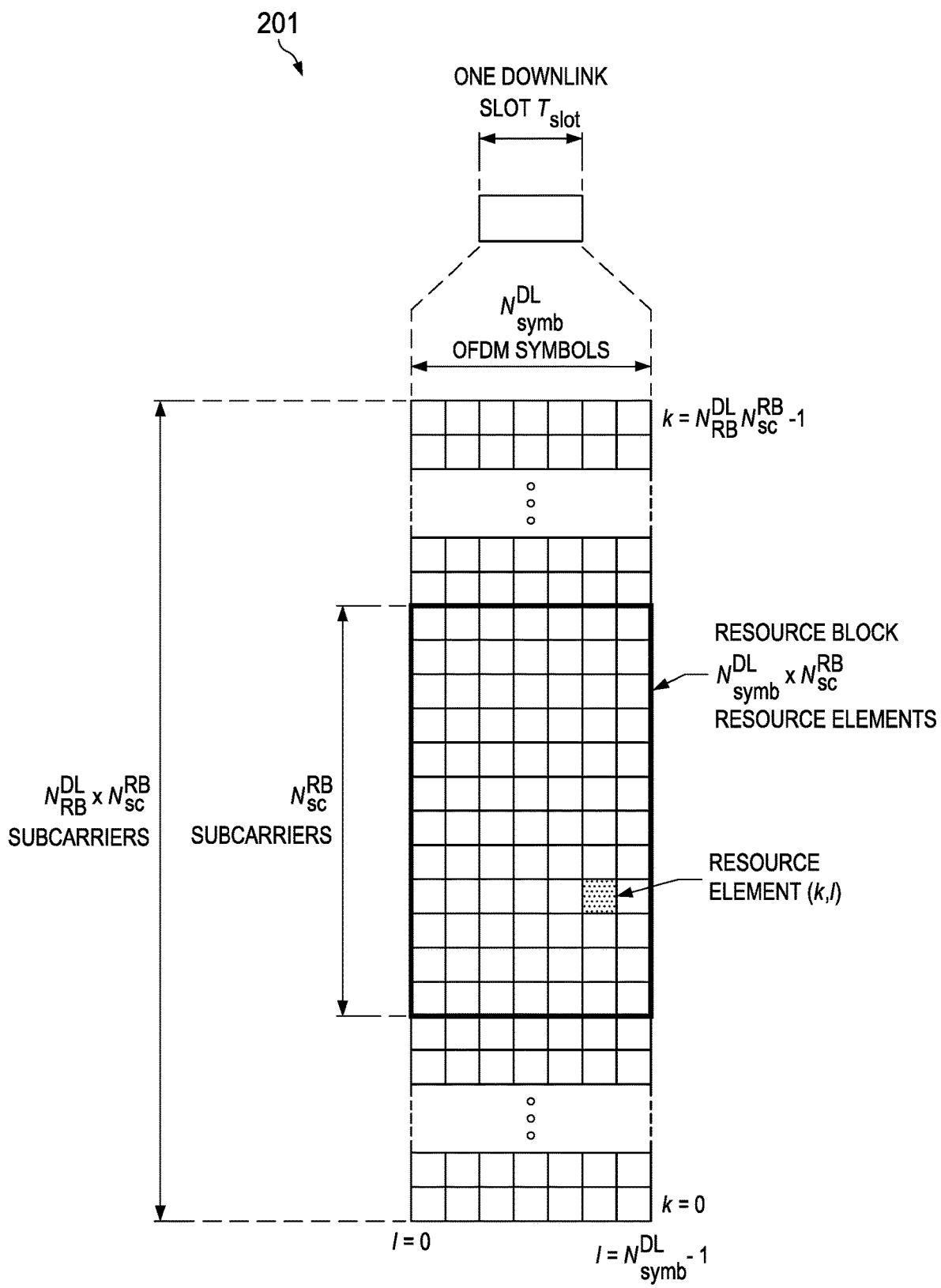
FIG. 2A illustrates a diagram of embodiment orthogonal frequency division multiplexing (OFDM) symbols with a normal cyclic prefix (CP)
Figure 2D:
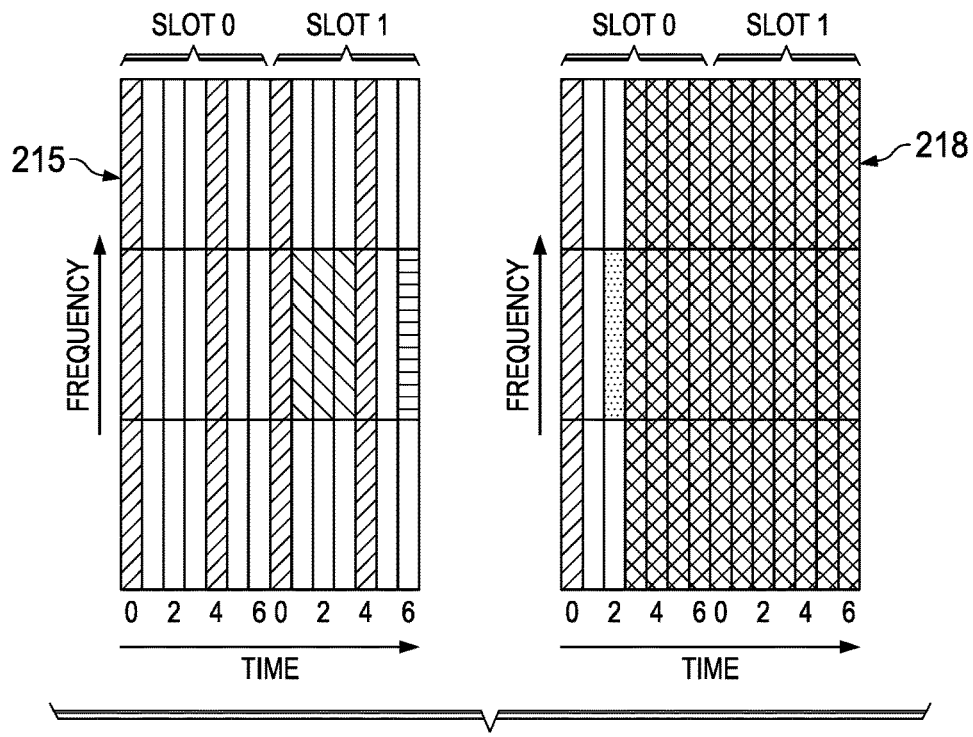
FIG. 2D illustrates a diagram of an embodiment OFDM subframe for TDD configuration.

FIG. 2C and FIG. 2D show embodiments of downlink subframes that are partitioned in terms of symbols and frequency. A subframe, such as subframe 205, is divided into 3 sections in the frequency domain (assuming the number of RBs is greater than 6). An analogous diagram can be shown for a 6 RBs downlink bandwidth (e.g., bandwidth of the downlink carrier).

In FIG. 2C, subframe 205 shows an embodiment of the symbol allocation for an FDD configuration for subframes 0 and 5. The solid shading shows the symbols that have the common reference signal (CRS). The example assumes either CRS is transmitted on antenna port 0 or on antenna ports 0 and 1. The horizontal shading shows the location of the secondary synchronization signal (SSS). The dotted shading shows the location of the primary synchronization signal (PSS). Both the PSS and SSS occupy the center six resource blocks of the downlink carrier. The diagonal lines in symbols 0, 1, 2, 3 of slot 1 represent the location where the physical broadcast channel (PBCH) occupies for subframe 0. The PBCH is not transmitted in subframe 5 in Rel. 11 of the standards. Note, the PSS, SSS, and CRS can be viewed as overhead.

In FIG. 2D, subframe 215 shows an embodiment of the symbol allocation for subframes 0 and 5 of TDD subframe 210 in FIG. 2B. Likewise, subframe 218 shows an embodiment of the symbol allocation for subframes 1 and 6 of TDD subframe 210. In both subframe 215 and subframe 218, the solid shading shows the symbols having the CRS. The example also assumes either CRS is transmitted on antenna port 0 or on antenna ports 0 and 1. The horizontal shading in subframe 215 shows the location of the SSS. The dotted shading in subframe 218 shows the location of the PSS. Both the PSS and SSS occupy the center six RBs of the downlink carrier. The cross shading in subframe 218 indicates that the remaining symbols of the subframe are either downlink (if subframe 6 is a downlink subframe) or a combination of downlink symbols, guard time, and uplink symbols if the subframe is a special subframe. Similar to FIG. 2C, the diagonal lines in symbols 0, 1, 2, 3 of slot 1 represent the location where the PBCH occupies for subframe 0. The PBCH is not transmitted in subframe 5 in Rel. 11 of the standards. Note, the PSS, SSS, and CRS can be viewed as overhead. The information contents of the PBCH (i.e., master information block) can change every 40 ms.

Figure 2E:
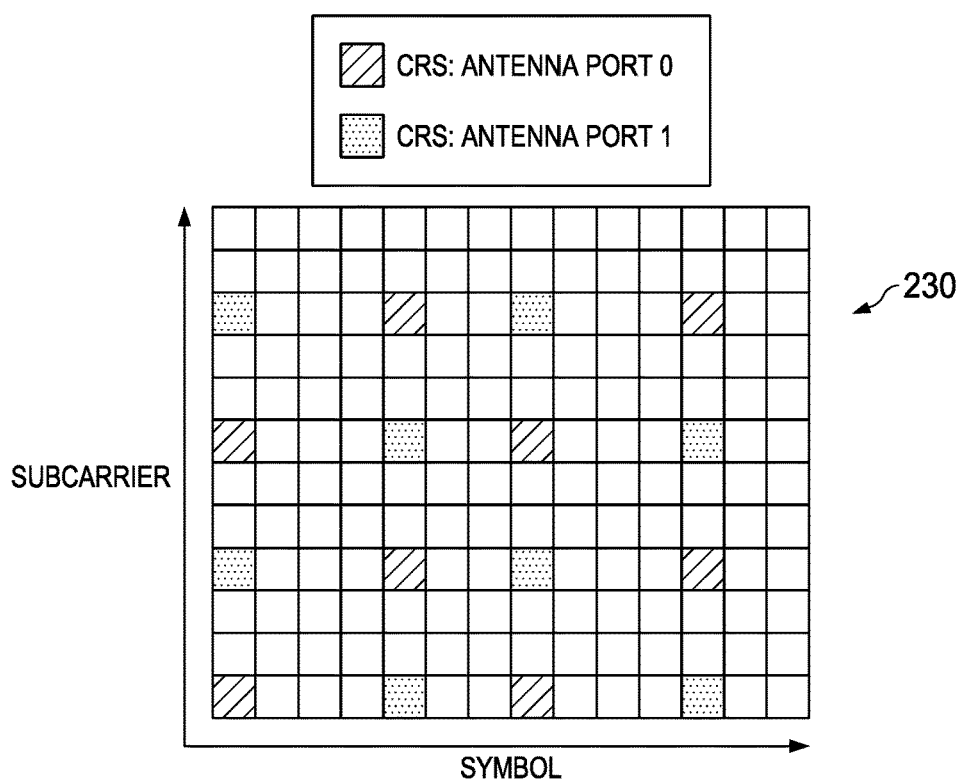
FIG. 2E illustrates a diagram of an embodiment common reference signal (CRS)

In downlink transmission of LTE-A system, there is reference signal for UE to perform channel estimation for demodulation of PDCCH and other common channels as well as for measurement and some feedbacks, which is CRS inherited from the Rel-8/9 specification of E-UTRA, as shown in diagram 230 in FIG. 2E. Dedicated/de-modulation reference signal (DMRS) can be transmitted together with the PDSCH channel in Rel-10 of E-UTRA. DMRS is used for channel estimation during PDSCH demodulation. DMRS can also be transmitted together with the enhanced PDCCH (EPDCCH) for the channel estimation of EPDCCH by the UE. The notation (E)PDCCH indicates EPDCCH and/or PDCCH.

Figure 2F:
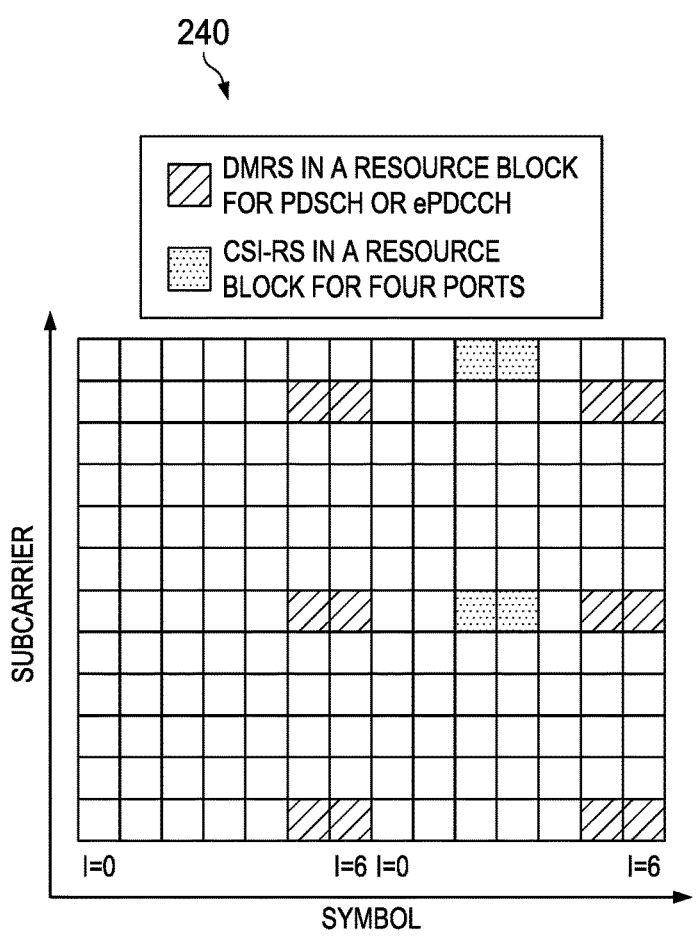
FIG. 2F illustrates a diagram of an embodiment channel status indicator reference signal (CSI-RS) and dedicated/demodulation reference signal (DMRS)

In Rel-10, channel status indicator reference signal (CSI-RS) is introduced in addition to CRS and DMRS, as shown in diagram 240 in FIG. 2F. CSI-RS is used for Rel-10 UEs to measure the channel status, especially for multiple antennas cases. PMI/CQI/RI and other feedback may be based on the measurement of CSI-RS for Rel-10 and beyond UE. PMI is the precoding matrix indicator, CQI is the channel quality indicator, and RI is the rank indicator of the precoding matrix. There may be multiple CSI-RS resources configured for a UE. There is specific time-frequency resource and scrambling code assigned by the eNB for each CSI-RS resource.

Figure 2H:
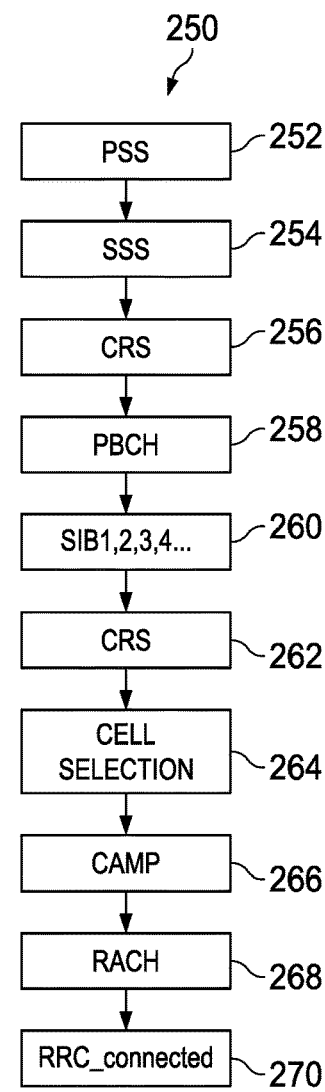
FIG. 2H illustrates a diagram of an embodiment synchronization and measurement scheme using reference signals.
Figure 2G:
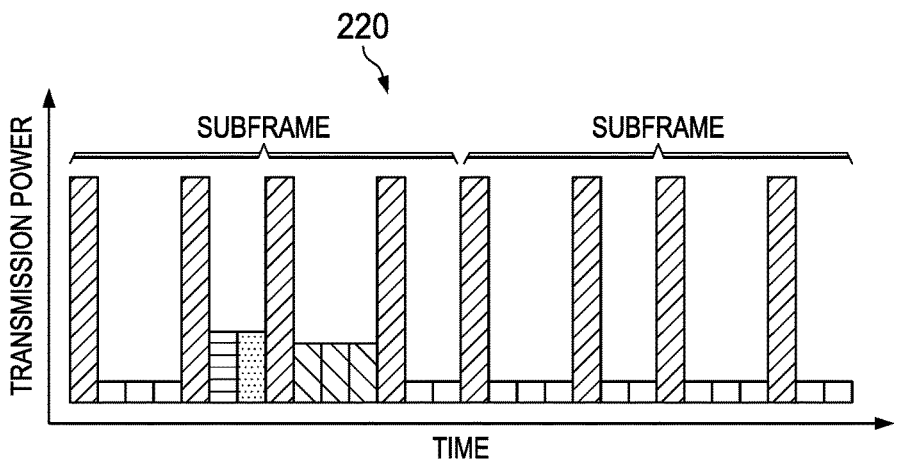
FIG. 2G illustrates a diagram of an embodiment transmission power allocation.

FIG. 2G shows an exemplary plot 220 of the transmission power from a communication controller, such as 105 in FIG. 1A, for a FDD configuration for subframes 0 and 1. Plot 220 shows the communication controller still transmits signals such as the CRS (solid shading), the SSS (horizontal shading), the PSS (dotted shading), and the PBCH (diagonal shading) even if there is no other data to transmit on the downlink. The transmission of these signals can increase the interference observed in a system such as in FIG. 1B even when communication controller 121 is not serving a UE such as wireless device 102. This interference can reduce the system capacity.

However, eliminating these signals entirely can impair system operation. For example, a wireless device relies on these signals to synchronize (both time and frequency) and then make measurements.

FIG. 2H is a flowchart illustrating an embodiment of a wireless device using the CRS, the SSS, and the PSS signals is presented in the flowchart 250 in FIG. 2H. The wireless device first detects the transmitted PSS in step 252. The wireless device can then detect the SSS in step 254. Having both the PSS and SSS provides the wireless device information such as: 1) frame configuration (FDD or TDD); 2) cyclic prefix used for certain downlink subframes; 3) the cell id; and 4) the location of subframe 0. In addition, the wireless device can perform coarse frequency and timing synchronization using the PSS and SSS.

Since the wireless device knows the cell id, cyclic prefix, and location of subframe 0, the wireless device can make measurements on the CRS in subframes 0 and 5 as shown in step 256. Example measurements are the reference signal received power (RSRP), the received signal strength indicator (RSSI), and the reference signal received quality (RSRQ). The CRS can be used to improve frequency and timing synchronization. If the measurements indicate that the communication controller is satisfactory (in terms of received signal quality), the wireless device may choose to process the PBCH to determine other information such as the number of antenna ports over which the CRS is transmitted, the frame numbering (e.g., 0 to 1023), and the downlink bandwidth (bandwidth of the downlink carrier) as shown in step 258.

The remaining steps in FIG. 2H show how the UE can become assigned to an eNB. In step 260, the UE listens to system information broadcast (SIB) messages, such as SIB1, SIB2, etc. To listen to SIB messages, the UE typically receives the PDCCH to process the downlink control information (DCI) to obtain the modulation, coding, etc. information for the PDSCH carrying the SIB message. In step 262, the UE may process more CRS for measurement purposes. In step 264, the UE may compare cells in one or more carriers and select a suitable one. In step 266, the UE may decide to camp on this carrier. In step 268, the UE may begin the random access procedure by transmitting the random access channel (RACH) on the uplink in order to enter the RRC_CONNECTED state in step 270. There may be a message exchange in step 270 between the UE and eNB. UEs have two states: RRC_CONNECTED and RRC_IDLE; the term "connected" can represent RRC_CONNECTED while "idle" can represent "RRC_IDLE. After the UE enters the RRC_CONNECTED, the UE sends a RRCConnectionSetupComplete message to the eNB.

One concept to reduce the interference from eNBs without any UEs attached (assigned, camped) is to turn those eNBs off. When UEs arrive, the eNBs would then turn on. Likewise, when there is no more traffic, the eNBs could then turn off. However, there are many modifications to the standards in order to support the on-off mechanism (on/off adaptation) such as the UE identifying the quality of an eNB based on the persistent transmission of signals such as the PSS, SSS, and CRS; when those signals are absent, how the UE can measure the quality. Other questions regarding small cell on/off adaptation, or more generally, network adaptation, include: (1) Coverage issue: ensuring cellular coverage despite of small cell on/off; (2) Idle UE issue: can small cell operating on/off support UEs in the idle state, what needs to be done to support idle UEs, in the connected state can the UE/eNB exchange data; (3) Legacy UE support (how to support UEs that do not have this feature); (4) How may fast on/off adaptation be supported? More specifically, how may fast on/off adaptation be supported, given procedures/mechanisms (in Rel-11/12 or even beyond) such as small cell discovery and measurement enhancements; dual connectivity or more broadly, multi-stream aggregation (MSA); CoMP and enhanced CoMP (eCoMP) (including CoMP Scenario 4 (a network with low power RRHs within the macrocell coverage where the transmission/reception points created by the RRHs have the same cell IDs as the macro cell), coordination over non-ideal backhaul); massive carrier aggregation, etc.

A small cell operating on/off adaptation or power adaptation frequently (e.g., in time scale shorter than hours) may not be suitable to support idle UEs because rapid adaptation can cause idle UE to enter cell reselection frequently and consume power. Similarly, they may not be suitable for coverage support that a macro cell can provide. Such a small cell may be mainly used to support active UEs' high traffic demand in addition to the basic functionalities provided by the coverage layer. The cells on the coverage layer may not perform on/off adaptation (at least they may not do so frequently). Idle UEs may be connected to coverage layer cells only. A consequence of this is that small cells do not have to be standalone cells at least from the perspective of legacy UEs. In certain isolated local areas, however, there may exist some scenarios where coverage is not a concern and high capacity is desirable; in such cases standalone small cells operating on/off may be deployed.

Therefore, typical deployment scenarios include a coverage layer whose cells do not perform network adaptation (or at least not too frequently or significantly), and a capacity layer whose cells (mainly small cells) may perform network adaptation. Coverage/mobility and idle UE support are mainly provided by the coverage layer. Typically UEs connect to cells in the coverage layer first, and then connect to small cells in the capacity layer when needed. The small cells may be co-channel or non-co-channel with those in the coverage layer. One embodiment deployment is shown in FIG. 1B.

As one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

The mechanism of dynamic on/off of a small cell is seen as more beneficial when further evolution of the small cell networks is envisioned. Specifically, to handle the ever increasing needs in data capacity, while meeting customer quality of service expectations and operators' requirements for cost-effective service delivery, the densification of a small cell network is proposed. Roughly speaking, doubling the density of the small cell network can yield doubling of the capacity of the network. However, densification leads to higher interference, especially the interference caused by common channels (e.g. CRS) which are persistently transmitted. Turning off the small cell opportunistically can significantly help reduce interference and improve efficiency of the dense network.

In parallel with increasing the network resources by densifying the network, another way to increase the network resources is to utilize more and more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared spectrums, and even high-frequency spectrum at millimeter wavelength (mmWave, mm wave, or mm-wave, mmW, etc.) range. The unlicensed spectrums can be used by generally any user, subject to regulation requirements. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Due to the fact that the licensed spectrum is generally scarce and expensive, utilizing the unlicensed spectrum by the cellular operator may be considered. Note that on high-frequency bands and unlicensed/shared-licensed bands, typically TDD is used and hence the channel reciprocity can be exploited for the communications.

On unlicensed spectrum, generally there is no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as:

CBP—"A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel." Note that the state of a channel being busy may also be called as channel unavailable, channel not clear, channel being occupied, etc., and the state of a channel being idle may also be called as channel available, channel clear, channel not occupied, etc.

One of the most used CBP is the "listen before talk" (LBT) operating procedure in IEEE 802.11 or WiFi (which can be found in, e.g., "Wireless LAN medium access control (MAC) and physical layer (PHY) specifications," IEEE Std 802.11-2007 (Revision of IEEE Std 802.11-1999)). It is also known as the carrier sense multiple access with collision avoidance (CSMA/CA) protocol. Carrier sensing is performed before any transmission attempt, and the transmission is performed only if the carrier is sensed to be idle, otherwise a random back-off time for the next sensing is applied. The sensing is generally done through a clear channel assessment (CCA) procedure to determine if the in-channel power is below a given threshold. In ETSI EN 301 893 V1.7.1, Clause 4.9.2, it describes 2 types of Adaptive equipment: Frame Based Equipment and Load Based Equipment.

Figure 3A:
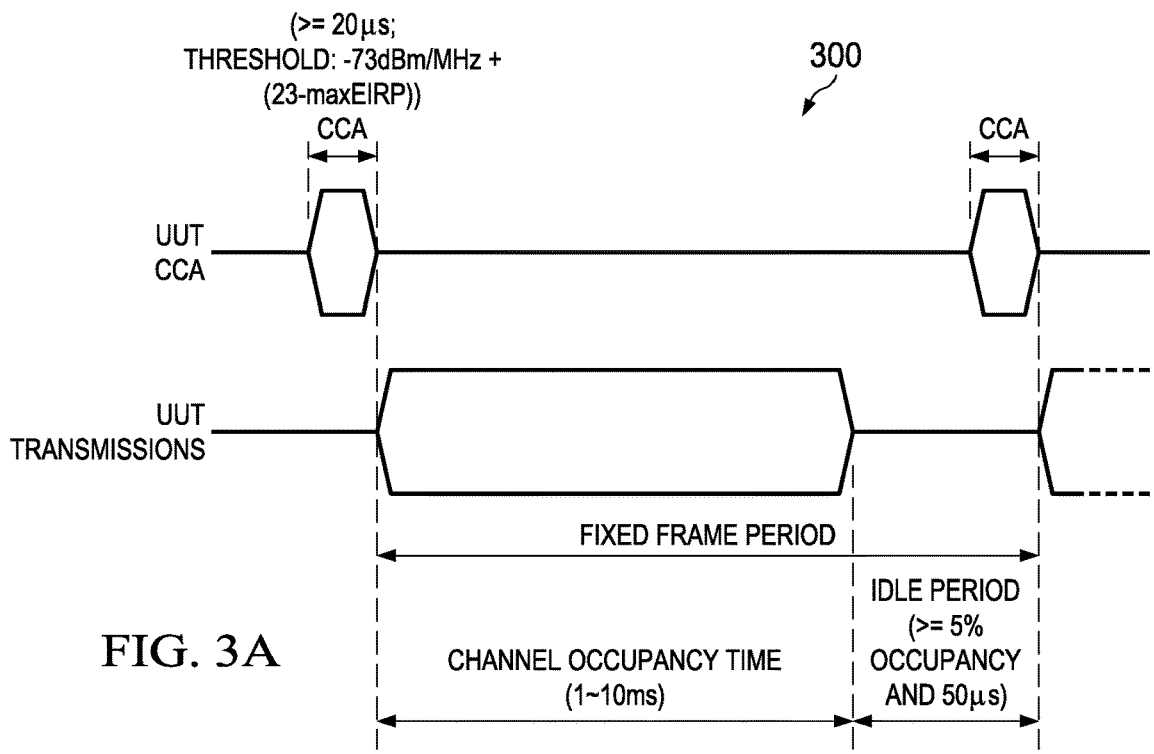
FIG. 3A illustrates a diagram of an embodiment frame based equipment operation scheme in an unlicensed band.
Figure 3B:
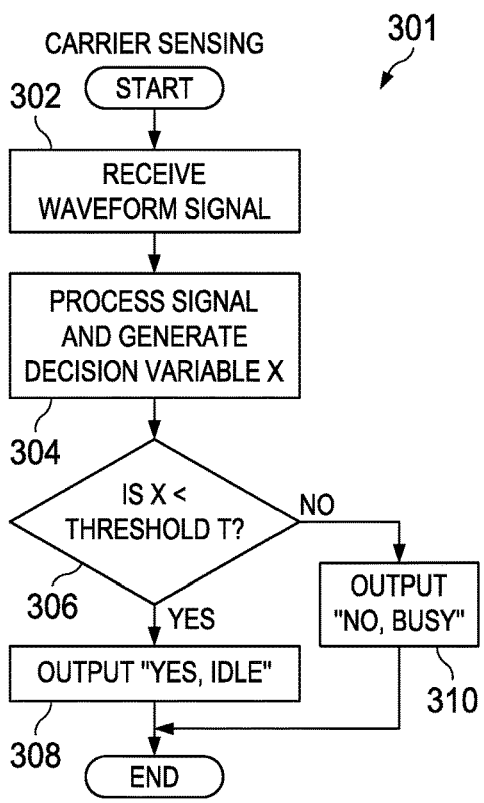
FIG. 3B illustrates a diagram of an embodiment carrier sensing scheme in an unlicensed band.

An embodiment of timing 300 for Frame Base Equipment is illustrated in FIG. 3A. An example of the flow chart for an embodiment method 301 for carrier sensing is illustrated in FIG. 3B. A flow chart of an embodiment method 320 for a general listen-before-talk mechanism is illustrated in FIG. 3C.

Referring now to FIG. 3B, the method 301 begins at step 302 where the communication controller receives a waveform signal from a UE. At step 304, the communication controller processes the signal and generates a decision variable, X. The signal processing here, in general done in the digital domain which is normally performed in baseband, may include sampling, A/D conversion, receiver's digital combining with precoding weighting, etc. The decision variable, X, is used to determine whether the channel is idle or busy. At step 306, the communication controller determines whether the decision variable is less than a threshold, T. The threshold may be a standardized value, or derived from a standard or some regulation, which may be device type specific, spatial specific, etc. The threshold may also be allowed to change within a specified range according to the traffic loads, interference conditions, etc. If, at step 306, the communication controller determines that the value of the decision variable, X, is less than the threshold, T, the method 301 proceeds to step 308 where the communication controller determines that the carrier channel is idle, after which, the method 301 ends. If, at step 306, the communication controller determines that the value of the decision variable, X, is not less than the threshold, T, then the method 300 proceeds to step 310 where the communication controller determines that the carrier channel is busy, after which, the method 301 ends.

Figure 3C:
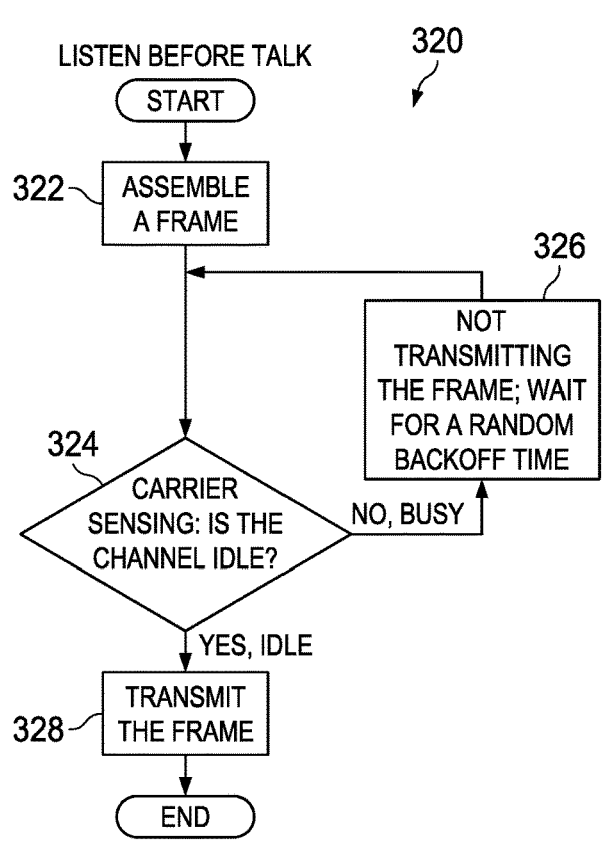
FIG. 3C illustrates a diagram of an embodiment listen-before-talk mechanism in an unlicensed band.

Referring now to FIG. 3C, the method 320 begins at step 302 where the communication controller assembles a frame. At step 304, the communication controller performs carrier sensing, such as described above with reference to FIG. 3B, to determine if the channel is idle. If, at step 304, the communication controller determines that the channel is not idle, but is busy, then the method 320 proceeds to step 306 where the communication controller refrains from transmitting the frame and waits for a random backoff timer to expire, after which, the method returns to step 304. If, at step 304, the communication controller determines that the channel is idle, then the method 320 proceeds to step 308 where the communication controller transmits the frame, after which, the method ends.

Figure 3D:
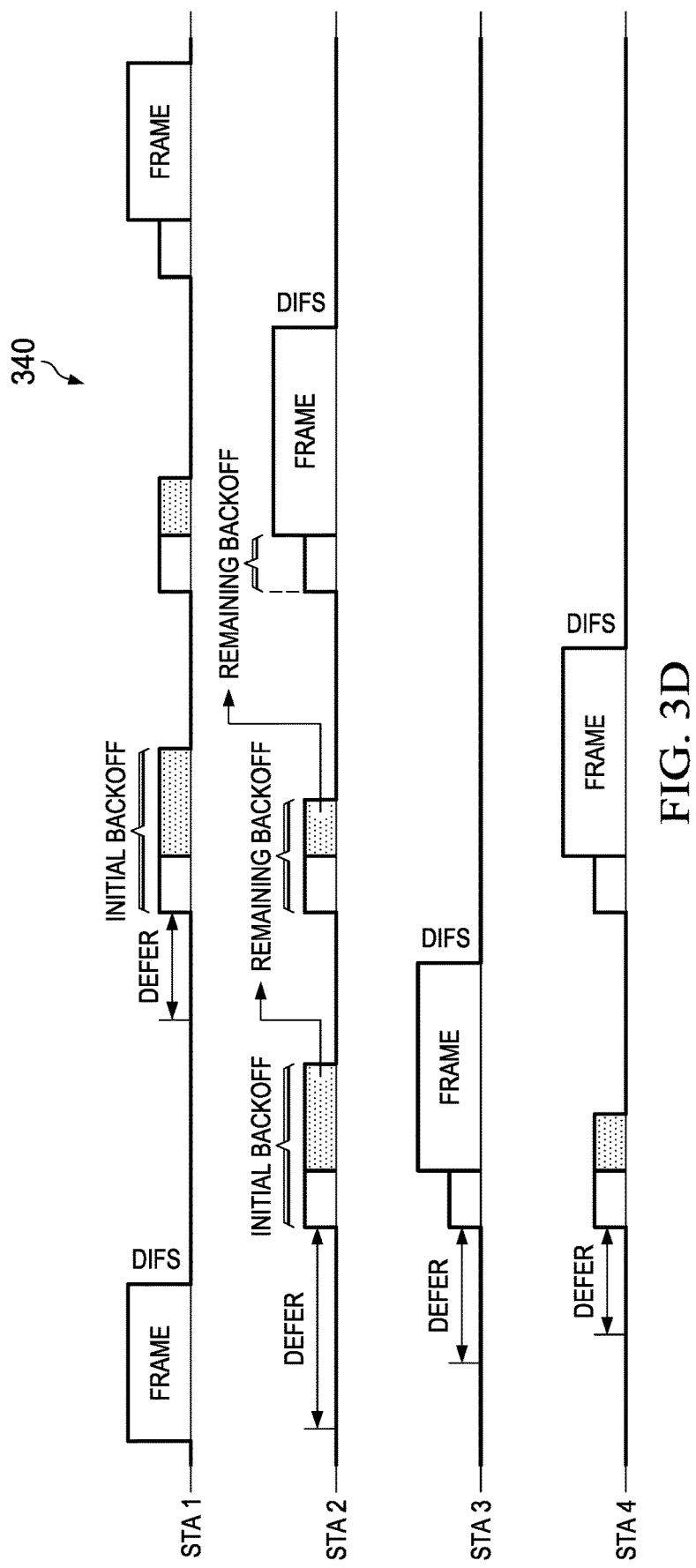
FIG. 3D illustrates a diagram of an embodiment WiFi CSMA-CA mechanism in an unlicensed band.

WiFi is the most eminent example of applying the listen-before-talk mechanism. WiFi uses 802.11 standards technologies as air interface (including physical and MAC layer). In 802.11, the communication channel is shared by stations under a mechanism called distributed channel access with a function called DCF (distributed coordination function), which uses CSMA/CA. The DCF uses both physical and virtual carrier sense functions to determine the state of the medium. The physical carrier sense resides in the PHY and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station with a data frame for transmission first performs a CCA by sensing the wireless channel for a fixed duration, i.e., the DCF inter-frame space (DIFS). If the wireless channel is busy, the station waits until the channel becomes idle, defers for a DIFS, and then waits for a further random back-off period (by setting the back-off timer with an integer number of slots). The back-off timer decreases by one for every idle slot and freezes when the channel is sensed busy. When the back-off timer reaches zero, the station starts data transmission. The channel access procedure 340 is shown in FIG. 3D.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

In addition, for operations in high-frequency bands, especially in the bands at 28 GHz to 60 GHz (or even up to 73 GHz and higher), they generally belong to the mmWave regime, which has quite different propagation characteristics from microwave (generally below 6 GHz). For example, mmWave experiences higher pathloss over distance than microwave does. At some frequency additional losses due to oxygen/air absorption and so on may also become non-negligible. In addition, at high frequency, the wavelengths, antenna sizes, and antenna spacing can all be smaller than those at low frequency; one direct consequence is that the antenna element at the receiver captures much less energy than that at lower frequency. These factors may significantly reduce the range of mmWave coverage. Therefore, high-frequency bands are more suitable for small cell operations than macro cell operations, and they generally rely on beamforming with a large number of antennas (e.g. >16, and sometimes maybe even a few hundred) for effective transmissions. Note that at high frequency, due to the small wavelengths, antenna sizes, and antenna spacing it is feasible to equip a node with a large number of antennas. As a result, the beams formed by the large number of antennas can be very narrow, for example, with beamwidth of 10 deg or even less. In sharp contrast, in traditional wireless communications, beamwidth is generally much wider, such as tens of degrees. In general, it is regarded that narrow beams are a feature of mm Waves. As a general rule of thumb, the beamforming gain by massive MIMO can be roughly estimated by N×K, where N is the number of transmit antennas and K the receive antennas. This is because the 2-norm of the channel matrix H scales roughly according to $(N \times K)^{1/2}$, and therefore if the precoding vector by the transmitting node is p, and the combining vector by the receiving node is w, then the composite channel is w'Hp, and by properly selecting w and p, the composite channel gain in energy can attain N×K, much higher than the case with fewer antennas. Currently most of the mmWave bands are not assigned as dedicated licensed carriers for cellular communications, but some of the bands can be usable by cellular as unlicensed carriers. In future more and more mmWave bands may be usable by cellular, either as unlicensed carriers or licensed carriers.

Thus, it can be seen that when considering further evolution of the small cell networks, the main scenarios may be small cell networks with abundant resources in both node-density dimension and spectrum dimension, where the spectrum resources may be in low-frequency (sub-3 GHz or sub-6 GHz) and/or high frequency (above 6 GHz or even above 28 GHz), and/or in unlicensed/shared-licensed/licensed bands. Specifically, the case where LTE operating on unlicensed spectrum is called unlicensed LTE (U-LTE) or LTE on unlicensed (LTE-U) or licensed-assisted access using LTE (LAA-LTE). In these scenarios, the small cells are generally overlaid with wider-area macro cells. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected resources are needed.

An embodiment method is adaptive resource selection. In other words, the network may adaptively select a subset of cell and/or carrier resources to be used for a UE. As there are more node resources and spectrum resources to be included in the network, from the UE perspective, it can discover multiple "cells" (a licensed component carrier, or CC, is generally viewed as a cell according to carrier aggregation; other nodes or carriers may be viewed as virtual cells or generalized cells with virtual cell IDs which may or may not be related to physical cell IDs). These cells may be configured for the UE (in slow time scale, for example), but not all will be used. The network selects a subset of the cells and signals to the UE (e.g., via RRC or MAC signaling, or via physical layer signaling for fast response). If a cell is not selected for any UE, it may be turned off and transmit only in a discovery burst (discovery RS burst, or DRS burst). If a cell is selected, the cell has to be on or turned on. The transition time is desirable to be as short as possible. In one embodiment, the bandwidth of a cell is not predetermined, but determined when it is selected for use or determined on the fly of the transmissions. For example, the cell and/or the UE may sense the usage of the spectrum and then decide on a portion of the spectrum which is less occupied.

Network adaptation, or adaptive transmission, has been studied in 3GPP, such as small cell on/off based on existing procedures. However, the main focuses have been reusing existing procedures, such as handover, SCell activation/deactivation, and dual connectivity procedures, to achieve small cell on/off in semi-static time scales. The on/off may be in a couple tens of milliseconds to hundreds of milliseconds. Faster or more dynamic on/off, or highly opportunistic transmission/reception/measurements with reduced on/off transition times (transition delays) are highly desirable, as they offer even higher performance gains and it is potentially necessary for U-LTE support and mmWave opportunistic usage. Thus, procedures and designs to support dynamic on/off at any time are desired. Generally, such cells may be activated SCells. In some cases, the cells can just be a configured SCell, activated or deactivated.

Compared with small cell on/off based on legacy procedures (e.g., handover, SCell activation/deactivation), small cell on/off based on the embodiment L1 procedure may have its distinct properties, scope, target, and scenarios.

Small cell on/off based on the embodiment L1 procedure may not rely on legacy procedures (handover and SCell activation/deactivation) for on/off. In addition, the embodiment L1 procedure may limit its standards impacts mainly to the physical layer, and it may not lead to significant impacts on higher layers (MAC, RRC, etc.), as in general the physical layer is more dynamic and flexible than higher layers. However, necessary supports by higher layers may not be precluded.

The embodiment L1 procedure may result in reduced transition times compared to on/off based on existing procedures such as handover or SCell activation/deactivation. The embodiment L1 procedure may lead to fast on/off, whereas on/off with the existing procedures falls into the category of semi-static on/off.

According to 3GPP 36.133, if a valid RRM measurement is available, then an activation time less than 24 ms can be feasible based on existing SCell activation/deactivation. The 24 ms includes 4 ms MAC CE decoding time and at least 4 subframes of DL transmission. In the case of TDD carrier with TDD configuration 0, it takes 20 ms for the UE to receive 4 DL subframes. In FDD cases, it takes only 4 ms for the UE to receive 4 DL subframes, so a transition time of faster than 24 ms can be feasible with the legacy SCell activation procedure.

The embodiment L1 procedure may lead to faster transitions (otherwise, the network can just rely on SCell activation/deactivation procedure). As concluded in 3GPP TR 36.872, reduced transition times lead to better performance. Therefore, subframe-level SCell on/off, if achievable with high reliability without considerably increasing UE complexity, may be considered. The feasible transition time scale will be analyzed later. Thus, it is desirable to target the transition time to be no longer than the duration of one radio frame (10 ms) in the worst case, and subframe-level transition is desirable and may also be supported.

Different scenarios may mandate different requirements and different designs. Part or all of the following scenarios may be considered for the embodiment L1 procedure: 1) Co-located versus non-co-located: The SCell operating fast on/off may be co-located or non-co-located with the PCell; 2) Inter-band CA versus intra-band CA: The SCell operating fast on/off may be in a different band or the same band as the PCell, and in the intra-band case, the carriers for the SCell and PCell may be contiguous or non-contiguous; 3) Synchronized versus un-synchronized: The SCell operating fast on/off may be time-synchronized or un-synchronized as the PCell.

Both the design complexity and applicability of the embodiment L1 procedure may be considered when defining the scenarios. At least the co-located and synchronized scenarios in both inter-band and intra-band may be considered, and un-synchronized scenarios may also be studied. Therefore, synchronized scenarios may be addressed first, and then un-synchronized scenarios may be addressed by further considering time/frequency tracking issues and related UE behavior issues.

How the SCell On/Off states are conveyed to the UE affects the UE complexity and reliability. For example, utilizing DCI to convey the On/Off states does not considerably increase the UE complexity since the UE can already perform such operations. Furthermore, if the DCI is sent from the PCell only, then the UE complexity for receiving the indication is regarded as low since the UE does not have to monitor the SCell all the time. In addition, using signals similar to existing ones (e.g. PDCCH/PDSCH) to carry the indication is regarded as reliable since their transmissions are well protected by existing mechanisms.

On the other hand, the UE complexity is regarded as considerably increased if the UE needs to autonomously detect whether a subframe is in the On state or Off state, in every subframe for all activated SCells. The UE autonomous detection usually involves blind detection of RS (e.g. CRS) and/or (E)PDCCH, and in some cases the UE may need to hypothesize on the detection of the RS for its further (E)PDCCH decoding attempts. As a result, the reliability of the UE autonomous detection may not be consistent and depend on various factors, such as the channel quality, UE implementation of the blind detection, channel estimation result, synchronization accuracy between the UE and SCell, etc. A missed detection caused by any of the factors may be mistaken by the UE as the SCell being in the Off state.

Therefore, an embodiment L1 signaling may be introduced for the embodiment L1 procedure to indicate the On/Off states of a SCell. This can support SCell fast on/off at any subframe with low UE complexity and high reliability (depending on the specific design).

To enable time/frequency tracking and automatic gain control at off to on transition, the time/frequency tracking may highly depend on the scenarios (e.g., synchronized or not) for which the embodiment L1 procedure is designed. When the time-synchronized scenarios are considered, the time/frequency tracking of SCell can rely on the PCell and no time needs to be spent on tracking during the off-to-on transition. For the case where un-synchronized or coarse synchronized carrier is assumed, some time may be allowed to achieve time/frequency tracking, and the exact number of subframes for initial time/frequency tracking depends on the design, such as the discovery reference signal (DRS) design. For example, if the DRS design is such that the timing obtained from one DRS occurrence can be maintained (e.g., within 3 us) till the next DRS occurrence, then zero subframe for initial time tracking is needed; otherwise more than one subframe may be needed.

The transition delay caused by RF tuning (assuming RF is on) and AGC settling has been studied. From these related studied one may estimate that the delay caused by RF tuning and AGC settling may be at most a couple of OFDM symbol durations of 140 □s. However, the 2 symbols of 140 us may be a loose upper bound in the activated SCell fast on/off case if periodic DRS/CSI-RS can be transmitted. The typical delay may be 0 symbol in such cases, or at most 1 symbol in some case. This is because the UE can base its RF and AGC on the latest DRS/CSI-RS. Note that this requires a standardization support, i.e., the standards need to require the UE set its RF/AGC based on the latest DRS/CSI-RS, which is a new UE behavior. As generally the DRS periodicity is tens of milliseconds and CSI-RS periodicity is 5 ms and tens of milliseconds, at least the analog AGC remains valid, and the digital AGC can be adjusted digitally without causing any extra delay. To summarize, in the case with low UE mobility, synchronous networks, and periodic DRS/CSI-RS transmissions with sufficient densities in time, the transition time needed for time/frequency tracking, RF tuning, and AGC settling may be negligible, and a simplified design may be feasible. In other cases, additional designs are needed to account for the transition times.

Figure 8:
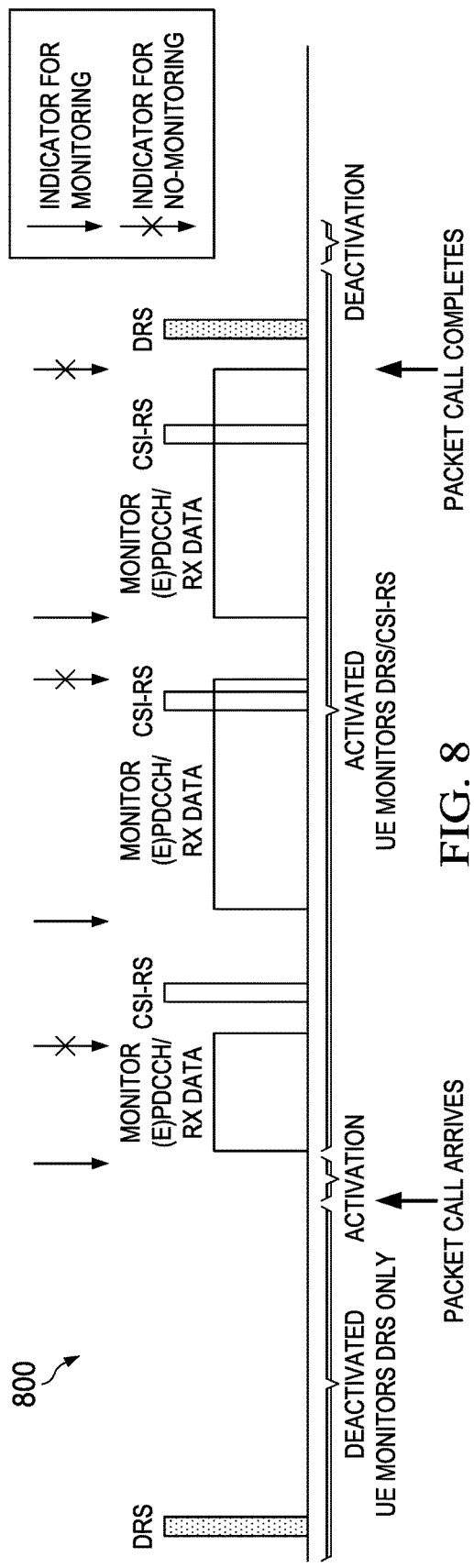
FIG. 8 illustrates a diagram of an embodiment procedure for monitoring UE behavior.

FIG. 8 is a diagram of an embodiment of a layer one procedure 800. The UE does not monitor the activated SCell except for subframes containing DRS or periodic CSI-RS or periodic CRS (whose presence and periodicity are configurable), unless it receives an indicator for starting monitoring of the SCell. After the UE receives the signaling, it starts monitoring for (E)PDCCH and may receive data for a number of subframes. Finally, the UE stops monitoring the SCell after it receives an indicator for stopping monitoring of the SCell.

To support small cell off-to-on transition at any subframe with low UE complexity and high reliability, the SCell off-to-on indicator may be sent from the PCell which, in many embodiments, the UE always monitors. For the case of SCell on-to-off transition, some kind of implicit indication may be possible. For example, the stop-monitoring indicator may be implicit based on the absence of (E)PDCCH for a certain amount of time. However, in some cases, it may be simple and beneficial to have a unified solution for off-to-on and on-to-off indication. Therefore it may be considered to also use explicit DCI message for both SCell off-to-on and SCell on-to-off indication, such as an indication bit is used. When the indication bit is set for the SCell, then it indicates the SCell is turning on; otherwise the SCell is turning off. A bitmap can be formed and sent from the PCell to indicate the state transitions of multiple SCells, and the mapping between the bits and the SCells can be predefined in RRC signaling. One more bit can be added for each SCell if needed, such as to indicate the state changes of the SCell in addition to directly indicating the on/off state. This may be needed since for the same SCell, UEs attached to it may have different states (monitoring or not monitoring). Only transmitting the on/off state of the SCell will force the UEs to start or stop monitoring upon receiving the indicator, but in some cases this is not desired if the network just wants the UEs to maintain their current states. For example, bit 1 is used to indicate if the UEs may keep their current states or update according to bit 2, and bit is used to indicate the on/off. Alternatively, the SCell identifier may be carried with the indicator. For example, the eNB may indicate with one or two bits that SCell 1 is turning on, turning off, or UE may keep or flip their current states. Another embodiment is just to indicate if the states need to be flipped or kept without indicating the on/off states; however this may have the drawback that if a UE misses one indicator, it may not work correctly since then. For example, the eNB may indicate with one bit of whether the UEs may keep or flip their current states. To summarize, various embodiments can be provided to signal the possible states: turning on versus turning off, and flipping the current states versus maintaining the current states. One or more of the states may be indicated.

With the above design, the UE starts monitoring the SCell's RS/(E)PDCCH upon receiving the On-state indication from the PCell, and it stops monitoring the SCell upon receiving the Off-state indication from the PCell. The On-state indication may be an explicit DCI signaling, or a SCell activation signaling. The Off-state indication may be an explicit DCI signaling, or a SCell deactivation signaling. The On/Off state indicators serve as the monitoring indicator and no-monitoring indicator for the UE. (Note that, however, the subframes with configured DRS/CSI-RS are always monitored by the UE when the SCell is activated for the UE.) One embodiment of the procedure and UE monitoring behavior is illustrated in FIG. 8. Note that the monitoring/no-monitoring indicators may be explicit or implicit. An embodiment of the no-monitoring indicator may be based on a timer of inactivity. Another embodiment of the indicators may be based on DRX configuration, i.e., when the UE enters the DRX, it stops monitoring, and when it enters On-period and in active time of the DRX cycle, it monitors the carrier. The DRX based embodiment and non-DRX based embodiment may be combined. In the monitoring period, UE may receive PDSCH based on self or cross-carrier (E)PDCCH scheduling. In the subframe scheduled by (E)PDCCH, UE monitors PDSCH and CRS/enhanced RS. In other subframes of the monitoring period, in one design, CRS may still be present for backward compatibility (i.e., the UE's assumption on the carrier is the same as in Rel-11), but in another design, CRS may not be present (i.e., the carrier acts as a embodiment carrier type) in all non-PDSCH subframe or in all non-PDSCH/CSI-RS subframes. In the no-monitoring period, the UE monitors only DRS and CSI-RS on the configured subframes on the SCell, respectively. However, on the CSI-RS subframes, CRS may still be present for backward compatibility or not present as a embodiment carrier type. Other than these, no transmissions may be monitored during the no-monitoring period. However, the above-mentioned UE monitoring and no-monitoring operations are mainly for the SCell performing on/off; it should be noted that the UE always monitors the PCell and other SCells not performing on/off. Therefore, it is feasible that the UE can always receive indication and/or scheduling information from the PCell (or another SCell) about a SCell regardless of the on/off state of the SCell. The indication/cross-carrier scheduling may be UE specific. It may inform the UE to monitor the current subframe of the SCell but not the next subframes (which may be useful for a short burst of data, or for providing the UE an opportunity to measure the SCell channel, update timing, etc.), or inform the UE to monitor (or not to monitor, resp.) the SCell from the current subframe until otherwise notified (which may be useful for altering UE monitor behaviour in a UE-specific way, instead of a UE-group-specific way). So even if the explicit DCI indicates no monitoring, upon receiving the cross-carrier indication or scheduling information about monitoring, the UE will operate according to the indication/scheduling information. Overall, this provides greater flexibility for the network. If subframe boundaries between the PCell and SCell are aligned, then the UE has to buffer the SCell subframe (or at least the first several symbols) while the UE attempts to detect PCell control signalling. If, however, the subframe boundary of the SCell lags that of the PCell, then the UE can just start buffering the SCell after finding the indication/scheduling information from the PCell.

The UE may start monitoring the SCell's RS/(E)PDCCH on the subframe where it receives the off-to-on indicator in DCI. There can be a brief transition time needed for the UE to receive from the SCell. In the cases with synchronized carriers and periodic DRS/CSI-RS transmissions, no time is needed for tracking, RF tuning, or AGC settling. However, one OFDM symbol duration may be needed for the indicator detection. That is, the UE may receive from the SCell starting from the 3rd OFDM symbol of the first subframe of the transition. On the other hand, if the UE is not synchronized with the SCell, and/or RF tuning and AGC settling is needed, it needs to receive some signals (e.g. CRS/PSS/etc.) from the SCell for some longer duration before it can decode (E)PDCCH or receive data.

In an embodiment, the frame structure is designed based on 2 OFDM symbol duration for transition, and the SCell subframe boundary is aligned with the PCell subframe boundary. That is, the DCI is transmitted on the PCell on the first OFDM symbol, and the UE detection/decoding of the DCI takes up to one OFDM symbol duration. No other transition time is needed. Then the SCell transmission can start on the 3rd OFDM symbol. Though PDCCH cannot be transmitted on this SCell subframe, EPDCCH can. Before the 3rd symbol, for REs not scheduled with any transmission according to legacy standards, the SCell can transmitted anything, which may be used for fine synchronization, RF tuning/retuning and AGC settling if needed.

In an embodiment, the frame structure is designed based on 3 OFDM symbol duration for transition, and the SCell subframe boundary is aligned with the PCell subframe boundary. That is, the DCI is transmitted on the PCell on the first OFDM symbol, and the UE detection/decoding of the DCI takes one OFDM symbol duration, and then the SCell transmits signals (but not data) on the 3rd symbol. Data is transmitted from the 4th symbol, and the control information can only come from other cells (e.g. PCell). The signals transmitted by the SCell on the 3rd symbol can contain RS if fine synchronization is needed, and any signal if RF tuning/retuning and AGC settling is needed.

In an embodiment, the frame structure is designed based on 5 OFDM symbol duration for transition, and the SCell subframe boundary is aligned with the PCell subframe boundary. That is, the DCI is transmitted on the PCell on the 1st and possibly 2nd/3rd OFDM symbols, and the UE detection/decoding of the DCI takes one OFDM symbol duration, and then the SCell transmits CRS on the 5th symbol, as transmitted according to legacy standards. Data is transmitted from the 6th or even 7th symbol, and the control information can only come from other cells (e.g. PCell). Before the 6th symbol, for REs not scheduled with any transmission according to legacy standards, the SCell can transmitted anything, which may be used for fine synchronization, RF tuning/retuning and AGC settling if needed.

An embodiment requires the UE to monitor each subframe after the SCell is activated. Therefore, the UE buffers each SCell subframe (but no further operation/processing is needed until PCell DCI detection result is available) while it attempts to decode the PCell DCI. If the PCell DCI for the SCell to be turned on is not detected, the buffered subframe is discarded; otherwise the subframe is further processed and every symbol can be used for data transmission.

An embodiment shifts the SCell subframe boundary so that it lags the PCell subframe boundary for a fixed amount of time. The offset can be chosen as the maximum transition time. For example, if one symbol is needed for DCI transmission, one for DCI detection, and one for AGC settling, then 3 symbol offset can be applied. Note that although the SCell subframe starts 3 symbols later than the PCell, the SCell can transmit signals (e.g. RS for AGC settling) one subframe before the SCell subframe boundary, i.e., the symbol right after the UE completes DCI detection. The UE needs to start receiving right after the DCI is detected and receives the last symbol of the subframe from the SCell. Then when the next subframe of the SCell starts, the UE can have its AGC (or timing, or RF, etc.) correctly set, and the next subframe is a complete subframe with (E)PDCCH/RS/etc. The fixed offset in terms of the number of OFDM symbols may be sent to the UE in RRC signaling or system information when the SCell is added to the UE. The UE applies the offset for any cross-carrier indication if the two carriers are configured with such an offset. In one embodiment, the cells on each layer have aligned subframe boundaries, but the small cell layers (capacity layers, U-LTE layers, etc.) is lagging the macro layer (coverage layer) by a fixed offset.

An alternative is to use implicit indicator. In this case, the PCell does not send any explicit indicator regarding the on/off state. The UE monitors every subframe, and detects if there is RS and/or (E)PDCCH for it on this SCell. There may be cases where RS is detected but no (E)PDCCH for this UE is detected, and the UE can update its measurements (CSI measurements and/or RRM measurements), and also the RS can help the UE with time/frequency tracking and AGC. There may be cases where (E)PDCCH for this UE is detected but no RS is detected except for DMRS used for demodulation, where the DMRS may be signaled to quasi-co-located with the RS detected elsewhere on the SCell (such RS may be part of the enhanced RS, which will be further discussed later) or a specified DRS. There may be cases where RS is detected and (E)PDCCH for this UE is detected, and the UE can update its measurements (CSI measurements and/or RRM measurements), the RS can help the UE with time/frequency tracking and AGC, and the RS may be used for demodulation of the PDCCH and possible the data.

For either the explicit indicator or the "implicit indicator", the network may further restrict on which subframes the indicator may be sent, thus reducing the UE's monitoring times. The cases with a FDD PCell and TDD SCell, and FDD PCell and TDD eIMTA SCell, and TDD PCell/SCell, etc., may be considered. For example, the turning-on transition may only occur in subframe 0 (and subframe 5), and hence the indicator may be sent only on subframe 9 (and subframe 4). A longer delay between the indicator and the turning-on transition may also be used, such as 2 or 4 subframes. If the subframe after the delay is not a DL subframe, then the turning-on will occur on the first DL subframe after the delay.

Figure 4:
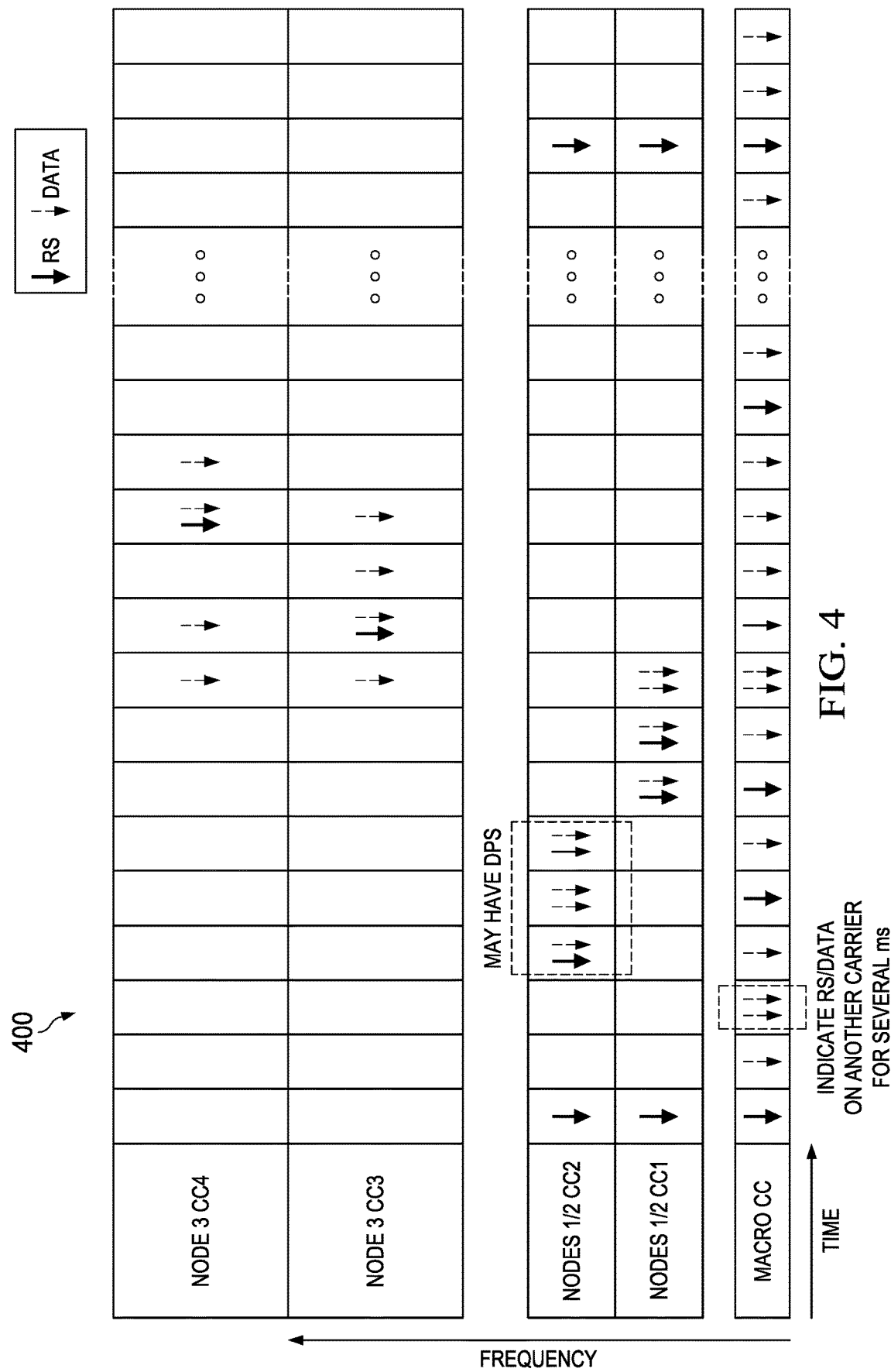
FIG. 4 illustrates a diagram of an embodiment adaptive resource selection and opportunistic transmission/measurement scheme.

FIG. 4 is a diagram illustrating an embodiment of adaptive resource selection and opportunistic transmission/measurements 400. The macro carrier normally acts as the PCell, and does not turn off. It transmits CRS and other common channels regularly. The UE generally always monitors the macro CC for CRS, common channels, signaling related to other CCs, and possibly data. Besides the macro CC, the UE has discovered a number of cells (e.g., by DRS) and some of them may be configured to the UE as possible transmission points. Node1 and node2 may be small cell operating in licensed spectrum, and each may have more than one CC, e.g., CC1 and CC2. They may be connected via fast backhaul. They may transmit DRS regularly with long duty cycles. They may be turned off in non-DRS burst unless a measurement/transmission is needed. For example, the macro may indicate that in a next subframe (with delay of 0 subframe, 1 subframe, or more subframes), node 1 and/or node 2 may transmit RS and/or data in CC1/CC2. Then the nodes may be turned on and the UE starts to monitor and feedback CSI reports.

Depending on the channel quality, interference coordination purposes, load balancing/shifting, etc., dynamic point selection (DPS, or DPB for dynamic point blanking) may be performed. Different from DPS used in Rel-11 CoMP, here the RS transmission may be turned off if a cell is not selected, and the RS transmission may be turned on if a cell is selected. The scheduling information may be from the macro or any of the cells, but signaling may be sent from a transmitting cell to indicate how the UE may receive the scheduling information, such as in a subset of the cells in the next few subframes. Similarly, a cell may further indicate the UE to monitor cells on unlicensed spectrum (e.g. node 3 CC3 and node 3 CC4). These cells generally do not use periodic measurements, so aperiodic measurement may be triggered to provide link adaptation capability. Usually the measurement may precede the data transmission on the unlicensed cell, but they may also be transmitted at the same time when the cell is selected, with possibly higher decoding error probability or with conservative data transmissions until the measurement result is obtained by the network.

Figure 5:
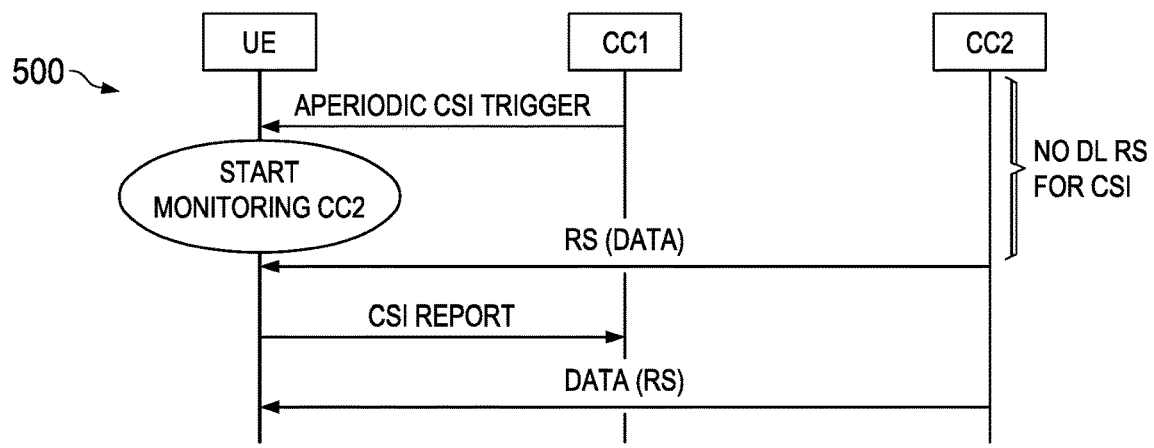
FIG. 5 illustrates a diagram of an embodiment design of CSI measurement/feedback on demand for link adaptation, based on DL RS and aperiodic CSI trigger.

FIG. 5 is a diagram illustrating an embodiment method 500 for design of CSI measurement/feedback on demand for link adaptation. In FIG. 5, CC1 may be a carrier that the UE is monitoring (e.g., CC1 may be PCell or an activated SCell). CC2 is an opportunistically on/off cell and has fast backhaul with CC1. There may not be DL RS for CSI measurements and reporting sent by CC2 when it is not selected. To support transmission on CC2, CC1 may transmit an aperiodic CSI trigger for CC2. In the same time, CC2 may start RS transmission. Upon receiving the trigger, the UE starts monitoring CC2 (and possibly data). An aperiodic CSI report may be generated and sent to the network (e.g. CC1). With the CSI report, CC2 can perform link adaptation for its transmissions accordingly. Then the operations between UE and CC2 may be similar to existing ones, such as periodic RS for CSI measurements may be transmitted, and periodic CSI reporting may be performed. Alternatively, the UE may rely on RS detection to determine the presence of RS. One can see that even though the aperiodic trigger may reuse the one defined in current spec, it still leads to different UE behaviors as in the old scenarios, the UE has received RS for its CSI measurements, but a measurement report may not be generated or reported until the trigger is received; whereas in the embodiment scenarios, the UE may not receive RS for its CSI measurements until the trigger is received.

The aperiodic CSI trigger may contain more information than the existing one. For example, it may tell the UE at least how long the UE may monitor CC2 (e.g., it may tell the UE to monitor at least 5 subframes, but for UE still receiving data on the 5th subframe, the UE can keep monitoring after those 5 subframes). The turning on or CC2 may not be for only one UE; a number of UEs may need to receive the trigger. In this case, group DCI may be used to trigger measurements and reporting by a number of UEs. The trigger may also be used for specifying more than one cell. For example, it may ask a group of UEs to monitor several cells.

Figure 6:
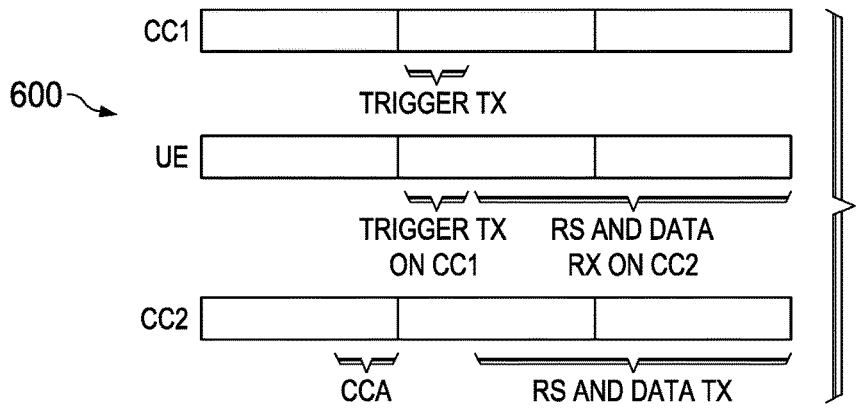
FIG. 6 illustrates a diagram of an embodiment design of CSI measurement/feedback on demand in U-LTE, based on DL RS and aperiodic CSI trigger, with aligned subframe boundaries.

FIG. 6 shows an embodiment system 600 of CSI measurement/feedback on demand for link adaptation, operating in U-LTE. The CC1 may be a cellular cell that the UE is monitoring, and CC2 may be an opportunistically on/off cell operating on unlicensed carrier and has fast backhaul with CC1 (e.g., CC1 and CC2 are collocated). There is generally no DL RS for CSI measurements and reporting sent by CC2 when it is not selected. Besides, CC2 cannot transmit until it senses no transmission on that unlicensed carrier for a period of time; i.e., CC2 has to perform clear channel assessment (CCA) before using the channel.

To support transmission on CC2, first CC2 may perform CCA in the last few OFDM symbols of a subframe. If the channel is clear, then CC1 may transmit an aperiodic CSI trigger for CC2; otherwise CC2 may repeat the CCA for a consecutive number of subframes. Generally the trigger is transmitted by CC1 in its PDCCH in the subframe following a successful CCA, and then the UE may detect and decode that trigger in at most a few symbol durations. Then starting from symbol x in that subframe which is no earlier than the end of the trigger, CC2 may start RS transmission. Upon receiving the trigger, the UE starts monitoring CC2 (and possibly data). An aperiodic CSI report may be generated and sent to the network (e.g. CC1). With the CSI report, CC2 can perform link adaptation for its transmissions accordingly. In an embodiment CC2 may need to reserve the channel after CCA. CC2 may also perform CCA until the first few symbols of the subframe that the trigger is sent, and transmit RS immediately after the CCA. The trigger may be alternatively transmitted in CC1's EPDCCH, which occupies last symbols of a subframe but normally not the first few symbols. In this case the CCA and the EPDCCH containing the trigger may be done in one subframe. Then the RS/data transmission can only start from the subframe after the EPDCCH. To make sure that the UE has time to detect and decode EPDCCH and prepare for monitoring CC2, the RS/data transmission may avoid the first few OFDM symbols of that subframe. CSI-RS may be a suitable candidate for the DL RS. Alternatively, if CRS is to be used, it may be transmitted only in the second slot in that subframe.

It should be pointed out that, although the above description such as FIG. 8 is based on the assumption that the CCA is at the end of a subframe, and the next subframe starts without CCA but just control/data transmissions, the definition of subframe boundary can also be modified so that the CCA is viewed as at the beginning of a subframe. The resulting frame structure is similar, except for the range of OFDM symbols that a PDCCH/EPDCCH is associated with is reduced. This variation can be applicable to above and all below embodiments of frame structures.

Figure 7:
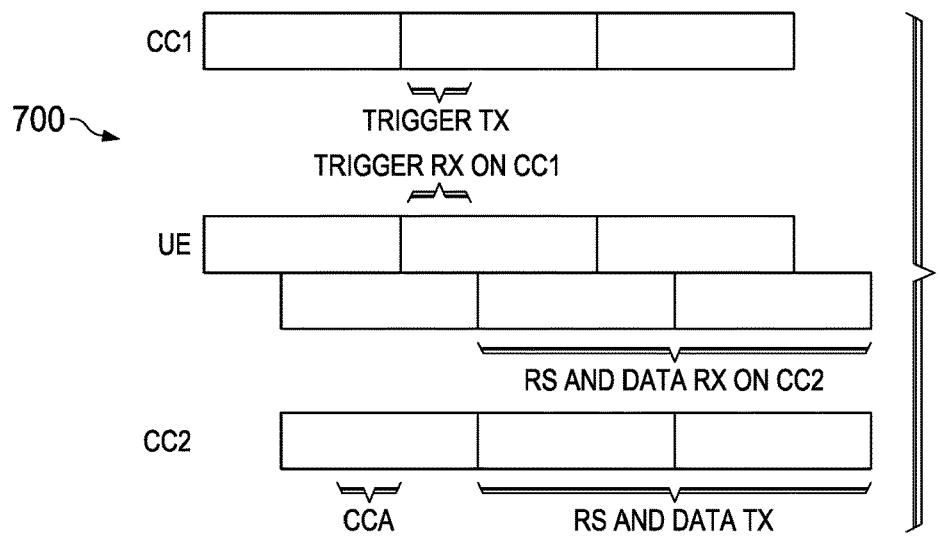
FIG. 7 illustrates a diagram of an embodiment design of CSI measurement/feedback on demand in U-LTE, based on DL RS and aperiodic CSI trigger, with shifted subframe boundaries.

Note that the RS and possible data transmission may not occur in the first few symbols of the subframe of CC2. In other words, every time CC2 starts this procedure, a few symbols may be lost. If such opportunistic transmissions occur frequently and each transmission is not long, the overhead may be high. Alternatively, CC2 may be time-shifted from CC1, as shown by system 700 in FIG. 7. For simplicity, the shift may be a slot, but it can be other durations such as one or more OFDM symbol durations. Then RS and possibly data can be sent in the subframe by CC2 immediately after the trigger is sent. The UE receives the trigger from CC1 (based on CC1 subframe timing), and it starts to buffer the subframe of CC2 immediately after that for RS and possibly data. The licensed carriers may have the same subframe boundaries (subject to allowable timing errors), and the unlicensed carriers use the licensed as reference timing, but with a (possibly common) shift of the subframe boundaries. Therefore, at the cost that the network and UE maintain two timings (though related), the unlicensed subframes can be fully utilized.

In an embodiment, the DL RS may be enhancement to better suit the dynamic on/off schemes. For DRS generally used for RRM measurements, in systems like U-LTE systems, they may not be able to transmit periodically, depending on if an opportunity exists or not. One way to resolve this issue is to use trigger-based DRS (which may still be called as DRS or called as some other RS) transmission, measurement, and/or reporting. In other words, a DRS may be sent only after the eNB seizes a transmission opportunity, and the eNB can notify the UE for performing the measurement. In this case, the network may provide another indicator of whether the UE may also report the RRM measurements for this triggering instance.

Some signals included in the DRS burst may also be used for CSI measurements, tracking, etc. Nevertheless, it may still happen that when a SCell is turning on, only outdated CSI is available. An enhanced RS for CSI measurements may be used. The RS may occur as early as possible with the first subframe after the trigger. The RS may be transmitted in full power. The RS may occupy the entire bandwidth. Proper muting/orthogonalization may be used to improve the RS's SINR, such as PDSCH muting for CRS, zero-power CSI-RS for non-zero-power CSI-RS, cyclic shift for different cells on overlapped REs. One example is the cyclic-shifted enhanced CSI-RS, on the first symbols of the subframe. Such enhanced RS can significantly boost CSI measurement accuracy and tracking performance. This enhanced RS will be further discussed later. With such enhanced RS, the density of the RS in time-domain does not have to be very high to ensure reliable CSI measurements. To allow for interference measurements, IMR may also be configured on the first symbols of a subframe, such as CSI-IMR or cyclic shift based IMR. Such enhanced RS may not need to appear in every data-carrying subframe, but at least for the initial subframe(s) after the turning on they can be transmitted. They can also be periodic after the turning on but before the turning off.

Even with the enhanced RS, at the first few subframes after the turning on, no up-to-date or accurate CSI may be available. The network may rely on conservative scheduling and transmissions, such as conservative MCS and transmission schemes (such as open-loop MIMO, transmitter diversity). The MCS and transmission schemes may be updated after more reliable CSI is available, such as closed-loop MIMO or MU-MIMO. The change of transmission modes, if needed, may be indicated in DCI or specified as a fixed delay associated with the CSI availability delay (e.g. 5 ms).

The network nodes on the unlicensed carriers may need to monitor the channel usage regularly, and UEs may be configured for this as well. For these purposes, these cells may not transmit anything on some time/frequency resources. For the cells controlled by the same operator, they may mute at the same time (wideband on all channels, usually aligned with Wi-Fi channels), and no UE may transmit. This may be done periodically. A blank subframe pattern may be used, or a smaller time granularity may be used, such as slots/symbols, or a mixture of these. Existing blanking patterns such as those defined for eICIC may be reused (and the signaling mechanism as well), but instead of an almost blank subframe (ABS), a blank subframe is used. The cells sense in the muting duration, and they may sense transmissions by other U-LTE systems or Wi-Fi systems. The statistics are recorded and used by the network to coordinate resource allocation/avoidance in U-LTE systems and to access the interactions with Wi-Fi systems.

The specification "3GPP TR 36.889 V13.0.0 (2015-06), 3rd Generation Partnership Project; Technical Specification Group Radio Access Network; Study on Licensed-Assisted Access to Unlicensed Spectrum; (Release 13)" is hereby incorporated herein by reference.

Listen-Before-Talk Design:

Use of a Listen-Before-Talk (LBT) procedure is vital for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. Thus, any LBT procedure involves at least energy detection to determine if the channel is being used. Regulatory requirements in some regions, e.g., in Europe, specify an energy detection threshold such that if a node receives energy greater than this threshold, the node assumes that the channel is not free. While all nodes need to follow such regulatory requirements, a node may optionally use a lower threshold for energy detection than that specified by regulatory requirements. For LAA, it is recommended that LAA supports a mechanism to adaptively change the energy detection threshold, at least for the downlink, i.e., it is recommended that LAA support a mechanism to adaptively lower the energy detection threshold from an upper bound. Such an adaptation mechanism does not preclude static or semi-static setting of the threshold. It should be noted that such a mechanism to adaptively lower the threshold may or may not have specification impact.

An LBT procedure applied at different nodes belonging to the same operator may result in these nodes not transmitting on the channel simultaneously. This may not be desirable in some planned operator networks where reuse of the same carrier frequency for simultaneous transmissions by neighbouring nodes can improve performance. It has therefore been identified that enabling frequency reuse for transmission by neighbour LAA cells of the same operator is one target of LAA design and that this aspect should be taken into account in the design of the LBT procedure.

A Category 4 LBT mechanism is the baseline at least for LAA DL transmission bursts containing PDSCH.

LAA supports uplink LBT at the UE. The UL LBT scheme can be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

For DRS transmissions, a single idle sensing interval allows the start of a DL transmission burst (which may not start with the DRS) containing DRS without PDSCH within the DMTC. This applies at least for DL transmission bursts less than 1+x ms, where x<<1 ms. The total sensing period may be greater than one sensing interval referred to in the above. The ECCA counter used for LBT category 4 for the PDSCH is frozen during DL transmission burst containing DRS without PDSCH.

Category 4 LBT Scheme Description:

The LBT scheme defined here is based on the procedure in Option B in clause 4.8.3.2 of ETSI EN 301 893, Harmonized European Standard, "Broadband Radio Access Networks (BRAN); 5 GHz high performance RLAN" except for the following modifications to form a category 4 LBT scheme that ensure fairness with Wi-Fi:

The size of the LAA contention window is variable via dynamic variable backoff or semi-static backoff between X and Y ECCA slots. Further details are provided below.

One candidate for variation of the contention window is exponential backoff. It should be noted that most of evaluations are based on exponential backoff.

The value of X and Y is a configurable parameter.

For PDSCH, the following two approaches to adjust the contention window size should be considered and it should be noted that a combination of the options listed below is not precluded.

Based on feedback/report of UE(s) (e.g. HARQ ACK/NACK)

Based on eNB's assessment (e.g. sensing based adjustment)

Consider minimum ECCA slot size smaller than 20 µs.

The initial CCA (ICCA) can be configurable to be comparable to the defer periods of Wi-Fi (e.g., DIFS or AIFS)

When ECCA countdown is interrupted, a defer period (not necessarily the same as ICCA) is applied after channel becomes idle. No ECCA countdown is performed during the defer period.

The defer period is configurable. It can be configured to be comparable to defer periods of Wi-Fi (e.g. DIFS or AIFS).

Initial CCA is performed to transmit a DL transmission burst when the eNB has not transmitted any signal/channel although the random backoff counter reached zero in the backoff procedure.

Adaptability of the energy detection threshold can be applied. In the above procedure, defer period is defined as the minimum time that a node has to wait after the channel becomes idle before transmission, i.e., a node can transmit if the channel is sensed to be idle for a time period not less than the defer period. The procedure described above is shown in FIG. 10: Flowchart of DL LAA SCell Cat 4 LBT procedure.

For PUSCH, extending the current single and dual cluster allocation to allow multi-cluster (>2) allocation (e.g. RBs/subcarriers spaced uniformly in frequency) has been identified as a candidate waveform that satisfies regulatory requirements and maximizes coverage. For this candidate waveform, the following aspects need to be addressed. identified below.

Number of clusters needed

Size of each cluster

Spacing between clusters or subcarriers

It is also recommended that SRS transmissions be supported in LAA. The Rel-12 design allows for two cases from a UE point a view, i.e., SRS either transmitted with a PUSCH transmission or transmitted separately from a PUSCH transmission. It is recommended that SRS transmissions are supported for an LAA SCell at least along with a PUSCH transmission.

In addition, it is recommended that LAA should target the support of UL multiplexing of multiple UEs in one subframe by multiplexing in the frequency domain and by multiplexing using MU-MIMO.

Transmission burst: A transmission burst on the DL and UL is defined as follows.

Each DL transmission burst is a continuous transmission from a DL transmitting node with no transmission immediately before or after from the same node on the same CC.

Each UL transmission burst from a UE perspective is a continuous transmission from a UE with no transmission immediately before or after from the same UE on the same CC.

Note that the UL transmission burst is defined from a UE perspective and this does not preclude the possibility of defining a UL transmission burst from an eNB perspective.

In case of an eNB operating DL+UL LAA over the same unlicensed carrier, DL transmission burst(s) and UL transmission burst(s) on LAA can be scheduled in a TDM manner over the same unlicensed carrier. Any instant in time can be part of a DL transmission burst or an UL transmission burst.

For LBT operation, an ECCA slot size of 9 µs may be used.

The actual sensing time is at least 4 µs within the slot.

For LBT Category 4 operation for PDSCH:

A defer period consists of a duration of 16 us followed by n consecutive CCA slots.

n is a positive integer

The duration of a CCA slot is 9 us.

FFS on number of slots in the defer period, e.g., n for different QoS classes.

No count down is performed during the duration of 16 µs at the start of the defer period.

The backoff counter may be decremented by one at the end of a defer period when all the n slot are observed to be idle.

If the counter reaches 0 after decrementing, the node does not transmit immediately and continues the ECCA procedure by performing a CCA check for at least one slot.

During the eCCA procedure, the backoff counter does not have to be decremented when a slot is sensed to be idle. If a slot is not observed, it should be assumed to be busy. There should be at least one extended CCA between two consecutive DL transmission bursts.

For multi-Carrier LBT on a group carriers

Alt1: eNB performs Cat-4 based LBT on only one unlicensed carrier

When the eNB completes LBT on a carrier, the eNB can sense other configured carriers for a period, e.g., PIFS (25 microseconds), immediately before the completion of LBT on the carrier.

The eNB is allowed to transmit DL data burst(s) on the carriers sensed idle according to above procedure.

FFS: How fast the eNB can change the carrier requiring Cat-4 based LBT.

FFS: Whether to apply the Wi-Fi channel bonding rule.

FFS: Energy detection threshold used on channels not performing Cat-4 based LBT.

Alt2: eNB performs Cat-4 based LBT on more than one unlicensed carriers.

The eNB is allowed to transmit DL data burst(s) on the carriers that has completed Cat-4 based LBT with potential self-deferral (including idle sensing for a single interval) to align transmission over multiple carriers.

FFS: If the eNB can receive on a carrier while transmitting on another carrier, freeze backoff counter(s) for the carrier(s) not transmitting while other carrier(s) is transmitting if the carriers are within X MHz apart.

In an unlicensed carrier, DRS and PDSCH can be multiplexed and transmitted within a subframe, at least in subframes 0 and 5, where the PDSCH transmission follows Cat4 LBT scheme defined for PDSCH.

Subject to LBT, allow the DRS without PDSCH to be transmitted in one of different time positions within the configured DMTC where the DMTC timing is relative to the PCell timing. In this case, Duration of the signals in the DRS (which doesn't include potential initial signal) is less than 1 ms (a single idle sensing interval is used for the LBT procedure prior to transmission of the DRS)

Allow DRS transmission in subframe other than #0 and #5

Position of DRS in a subframe is the same for all candidate subframes in the DMTC Following alternatives can be considered for sequence generation for SSS/RS in subframes with DRS Alt. 1: Generate SSS/RS sequences according to the subframe index of DRS.

Alt. 2: Generate SSS/RS sequences irrespective of the subframe index of DRS.

For the UE reporting RSSI measurement in the unlicensed carrier, the timing where the UE may perform RSSI measurement should be indicated to the UE Every subframe 0 and 5, when transmitted by the eNB, should contain Rel-12 PSS/SSS/CRS where PSS/SSS/CRS in the LAA DRS is a subset of these signals.

Number of CRS ports should be the same or higher than the number of CRS ports in the DRS.

A DL transmission burst (which may not start with the DRS) containing DRS without PDSCH within the DMTC immediately follows a single idle observation interval of at least 25 us.

The total duration of the DL transmission burst is not longer than 1 ms (i.e. x=0).

The signals comprising the LAA DRS are the same as symbols 0-11 of the Rel-12 DRS for FDD (LAA assumes normal CP); DRS occasion duration is 12 symbols; non-zero power (NZP)-CSI-RS of the Rel-12 DRS can be transmitted in symbols #9 and #10, if configured.

The measurement duration (averaging granularity) for a single UE-reported RSSI measurement instance should be indicated to the UE:

Support a minimum duration of one OFDM symbol

Support a maximum duration of 5 ms

A measurement gap duration (i.e. 6 ms) may contain multiple measurement instances DL transport block in the last subframe of a DL Tx burst can be transmitted using DwPTS structure, or a full subframe FFS how to signal the structure of the last subframe FFS whether to define a 13-symbol partial subframe FFS whether DwPTS structure with 3 OFDM symbols can be used for the last subframe A UE may be configured with DRS and CSI-RS in the same subframe, for the purpose of CSI channel measurement using the configured CSI-RS.

Signaling parameters describing the potential periodic subframes for NZP CSI-RS and CSI-IM configured for CSI measurement may be the same as in Rel-12, with potentially aperiodic subframe case, and potentially DRS occasion overlapping with potential periodic subframe configured for NZP CSI-RS and CSI-IM.

There are a few embodiments for indicating the duration of a data burst. For example, a bit in a DCI may be used in every subframe of a data burst to inform a UE if this is the last subframe or not. This may entail a new field in the DCI. For example, the bit may be set to indicate that a subframe is the ending subframe, otherwise the subframe is not the ending subframe. Or, the bit may be set to indicate that a subframe is not the ending subframe, otherwise the subframe is the ending subframe. Alternatively, the field may be optionally carried in a DCI in an ending subframe. The payload size of the DCI may be modified as a result, and UE blind detection may be used.

Figure 9:
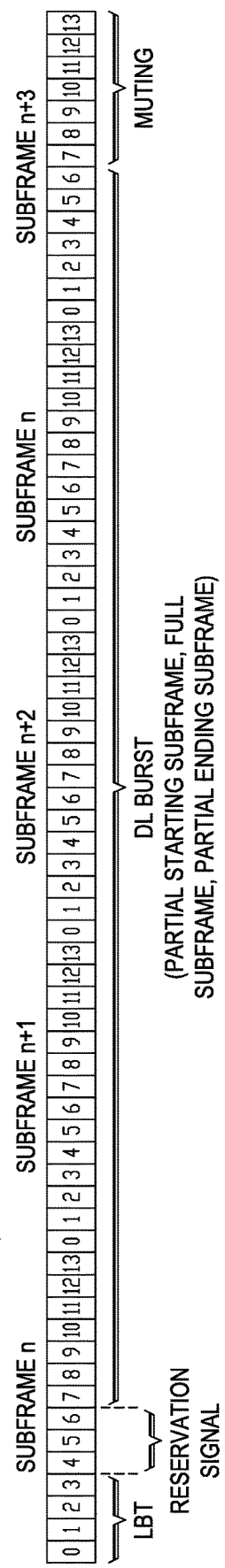
FIG. 9 illustrates a diagram of an embodiment data burst with a partial starting subframe and a partial ending subframe.

A subframe in a data burst may be a full subframe or a partial subframe. FIG. 9 illustrates an embodiment data burst structure 900 with a partial starting subframe and a partial ending subframe. There may be a few embodiments for indicating a location of an ending symbol of a subframe, a location of an ending symbol of a next subframe, and/or a duration of a subframe, especially if a partial subframe such as a partial ending subframe is included. For example, a number of bits in the DCI in every subframe of a data burst may be used to inform a UE how many OFDM symbols (OSs) the current subframe spans. This may entail a new field in the DCI. Such a subframe may adopt a special subframe in a TDD scheme, e.g., the DL part of the subframe. For example, the subframe may adopt the downlink pilot time slots (DwPTS) structure. Alternatively, an indicator may be optionally carried in a DCI in a partial subframe. The payload size of the DCI may be modified as a result, and UE blind detection may be used. As a result of the subframe duration indication, UE blind detection to determine if an eNB is transmitting or not may be reduced. Table I illustrates a subframe configuration for LAA in the current and/or next subframe.

TABLE I

| Value of "Subframe Configuration for LAA" Field in Current Subframe | Configuration of Occupied OFDM Symbols (Current Subframe, Next Subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

A DwPTS structure may have 3, 6, 9, 10, 11, or 12 OSs in a subframe. As illustrated in Table I, the number of OSs in a subframe may be indicated to the UE. A subframe in a data burst may also be a full subframe and span 14 OSs. Therefore, in an embodiment, the following possible number of OSs in a subframe may be indicated: 3, 6, 9, 10, 11, 12, and 14. An ending indicator may also be incorporated for an ending full subframe, such as 14E. Thus, a total of eight possible OS numbers may be indicated, and a 3-bit DCI field may be used as an indicator. For example, the 3 bit indicator may be 3, 6, 9, 10, 11, 12, 14, or 14E. Alternatively, 13 OSs may be allowed for an ending subframe, the 3 bit indicator may be for 3, 6, 9, 10, 11, 12, 13, 14, and the ending or not is indicated by another bit or implicit by this field. In another embodiment, 3 OSs may not be supported, and this option may be replaced by 13 and/or 14E. For example, the 3 bits may be 6, 9, 10, 11, 12, 13, 14, or 14E. A down selection of the DwPTS OSs may be supported, with 2 bits to indicate a subset of the options identified above. The 13 OS case may be for blanking the last OFDM symbol for the next subframe's carrier sensing, especially if the next subframe is a DRS burst or DMTC. Note that for DRS transmission, the carrier sensing may fit within an OS. It should be noted that although 3, 6, 9, 10, 11, 12, and 13 are used herein as preferred embodiments, a partial subframe in other embodiments may span a different number of OSs.

The partial subframe utilizing the special subframe structure or the DwPTS structure may be an ending subframe of a data burst. Therefore, the partial subframe structure may be present only in the ending subframe of a data burst, and when detected, the partial subframe may be determined by a UE to be the ending subframe. Alternatively, the partial subframe structure may be present in all subframes. In this case, a non-ending subframe may have 14 OSs, and a subframe is determined an ending subframe if a non-14 OS subframe indicator is detected or if 14E is detected. The guard part and the UL part of a DwPTS may not be present.

After the ending subframe, the UE may stop monitoring for a predefined period of time, for example at least a minimum number of subframes. This may be specified in the specification, or in the DCI signaling in the ending subframe. Such signaling may be used as a signaling of the ending subframe. There can be a few bits for this purpose. For example, if 1 bit is used, then 0 may be for non-ending, and 1 for ending, and a predefined number of subframe non-monitoring (specified in the specification) may follow the ending subframe. In another embodiment, 0 may indicate n1 subframe non-monitoring and 1 for n2 subframe non-monitoring subframes following the ending subframe. If 2 bits are used, then 0 may stand for a non-ending subframe, 1 for n1 non-monitoring subframes, 2 for n2 non-monitoring subframes, and 3 for n3 subframe non-monitoring subframes. Alternatively, a non-ending indicator may not be included in a DCI message. Note that DRS burst monitoring (or DMTC monitoring) may not be affected by the indication, especially as DRS LBT is associated with higher priority. However, the indication may affect the UE's monitoring behavior for DRS/DMTC. Alternatively, 0 may be for the potential DRS/DMTC monitoring only in the next subframe. This may be especially useful if 13 OSs ending subframe is included.

Any of the above embodiment indications may be sent to a group of UEs monitoring the carrier or to all UEs monitoring the carrier. This may be sent in a special CSS for (E)PDCCH associated with a SCell, specifically a LAA SCell, or a general assisting SCell, or in a common search space (CSS) for (E)PDCCH. This may be sent with the format 1C or 3 to a group of UEs. This may be sent from a PCell for a SCell or from a SCell monitored by a UE for that SCell.

A UE's behavior may be affected by an indicator for an ending subframe. For example, if a subframe is indicated to be an ending subframe, then a UE may assume the next subframe(s) may not include transmission, such as assuming that a CRS has been transmitted, and the UE may not attempt to detect (E)PDCCH. Otherwise, the UE may assume at least CRS may be included in the next subframe, and may attempt to detect (E)PDCCH for CSS and/or UE-specific search space (UESS).

Figure 10:
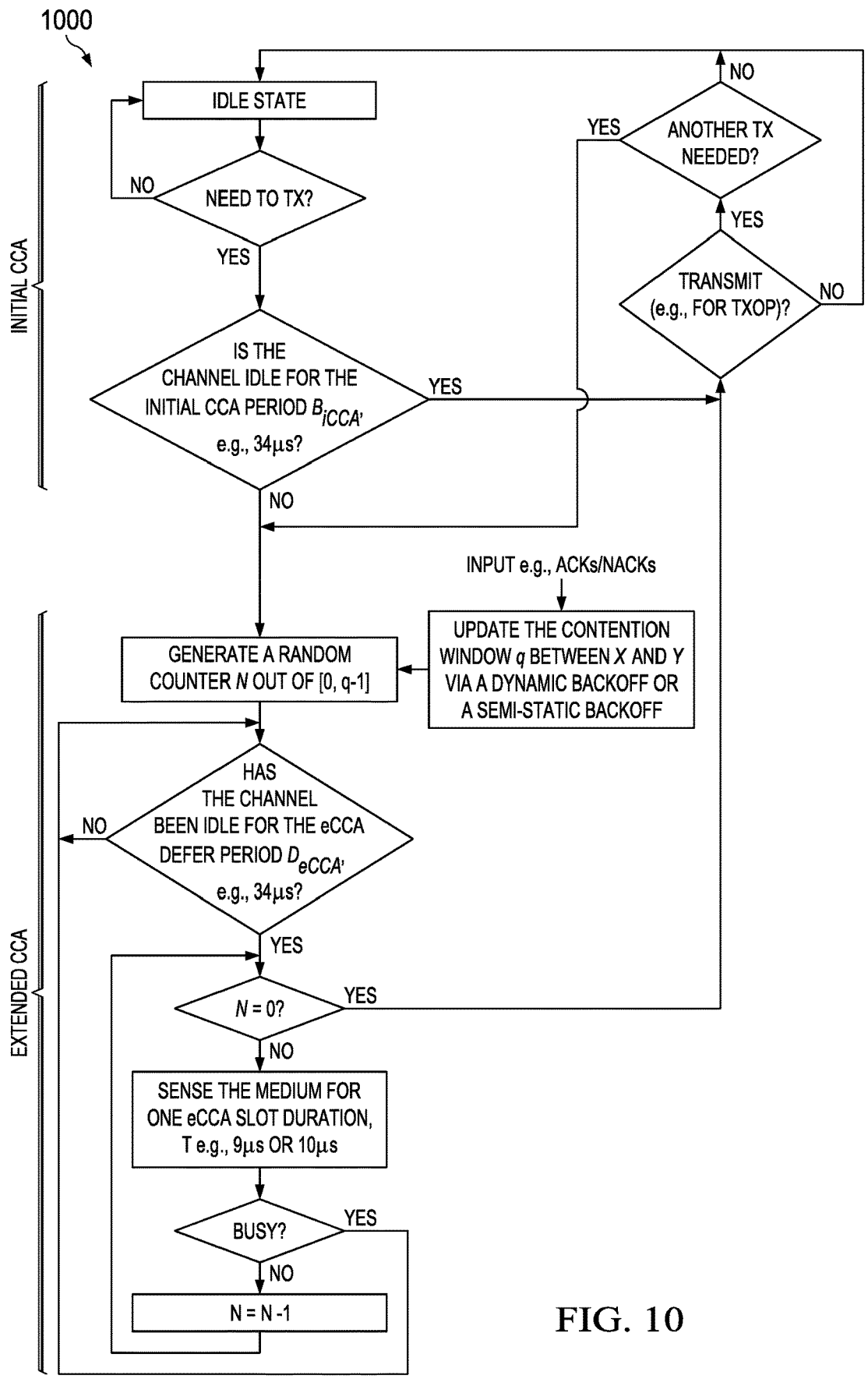
FIG. 10 illustrates a flowchart of an embodiment initial CCA and extended CCA scheme.

FIG. 10 illustrates a diagram of an embodiment Initial CCA and Extended CCA scheme. In the initial CCA, a transmitting device in the network, e.g., a UE or an eNB, may be in an idle state. If a transmitting device needs to transmit (TX), the transmitting device may determine if the channel is idle for the initial CCA period. If the channel is determined to be idle for the initial CCA period, the transmitting device may perform a transmission (e.g., for TXOP). If there is no transmission or no other transmission, the transmitting device may return to the idle state after this transmission. If the channel is not determined to be idle for the initial CCA period, then a random counter with an updated contention window may be used. The period of the random counter may be called an extended CCA. When the channel is idle for a predefined period, the channel may be sensed again within the extended CCA period. When the random counter has elapsed, the transmitting device may perform a transmission.

Figure 11:
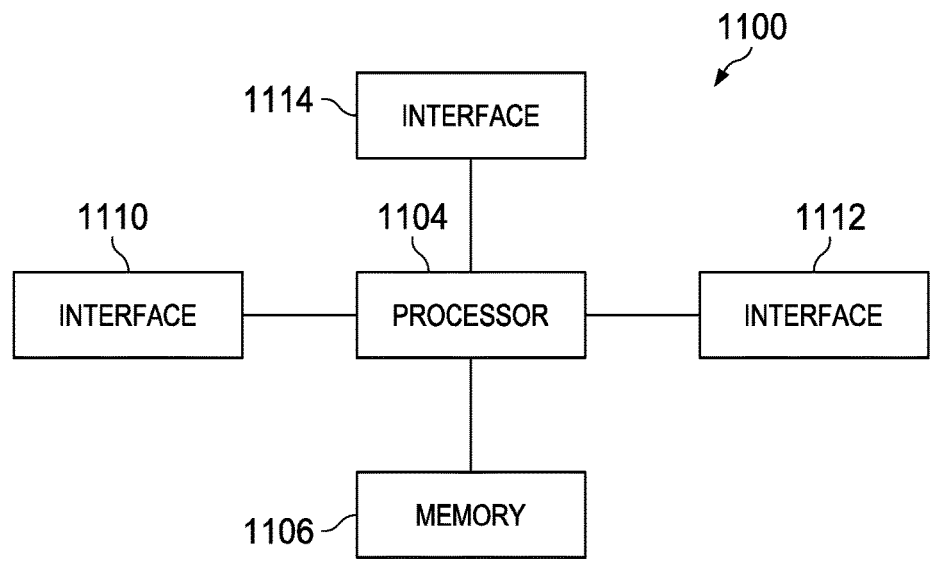
FIG. 11 illustrates a block diagram of an embodiment processing system for performing methods described herein, which may be installed in a host device.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1110, 1112, 1114 connects the processing system 1100 to a transceiver adapted to transmit and receive signaling over the telecommunications network.

Figure 12:
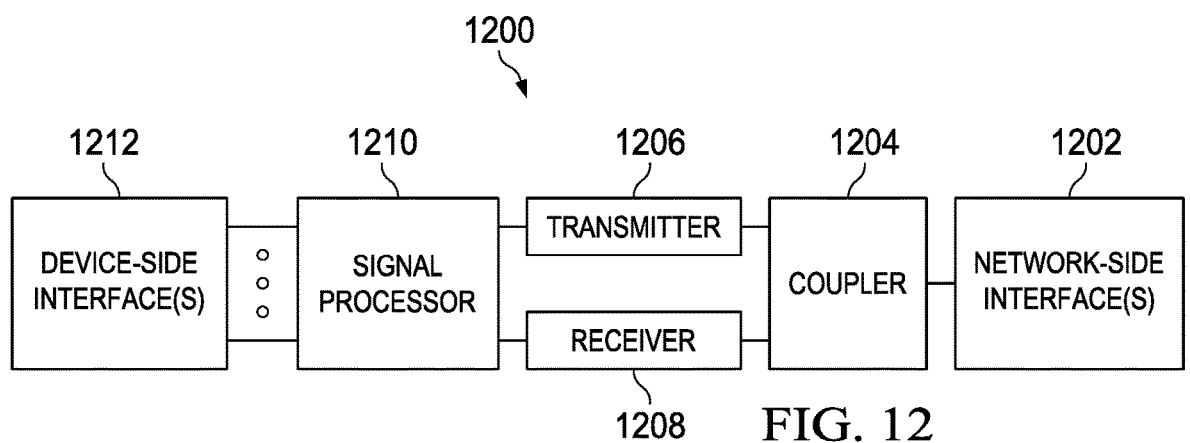
FIG. 12 illustrates a block diagram of a transceiver adapted to transmit and receive signaling over a telecommunications network.

FIG. 12 illustrates a block diagram of a transceiver 1200 adapted to transmit and receive signaling over a telecommunications network. The transceiver 1200 may be installed in a host device. As shown, the transceiver 1200 includes a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 includes one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for subframe configuration, the method comprising:
   receiving, by a user equipment (UE), a first indicator from a secondary cell (SCell), and based thereon, starting to monitor the SCell;
   receiving, by the UE, a subframe of a data burst from the SCell of the UE, the data burst including a plurality of subframes and ending with an ending subframe, wherein control information in the subframe indicates whether the subframe is the ending subframe or another subframe in the data burst, and wherein the control information includes a field that indicates a duration of the subframe as a number of occupied orthogonal frequency-division multiplexing (OFDM) symbols; and
   receiving, by the UE, a second indicator from the SCell instructing the UE to stop monitoring the SCell during a subframe in which the SCell remains activated and performs transmissions, and based thereon, ceasing to monitor the SCell during the subframe in which the SCell remains activated and performs transmissions.

2. The method of claim 1, wherein the control information is included in downlink control information (DCI) of a physical downlink control channel (PDCCH).

3. The method of claim 1, wherein the ending subframe in the data burst is one of a full ending subframe and a partial ending subframe, wherein the full ending subframe comprises a predefined number of OFDM symbols and the partial ending subframe comprises a fraction of the predefined number of OFDM symbols.

4. The method of claim 3, wherein the partial ending subframe uses a time slot structure in a time division duplexing (TDD) scheme, and wherein the time slot structure is downlink pilot time slots (DwPTS).

5. The method of claim 1, further comprising:
   determining, by the UE, that the subframe is a non-ending subframe in the data burst based on the control information.

6. The method of claim 1, wherein the control information is destined to a group of UEs.

7. The method of claim 1, wherein starting to monitor the SCell comprises starting to monitor, by the UE, a channel for a reference signal (RS)/(enhanced) physical downlink control channel ((E)PDCCH) of the SCell.

8. The method of claim 7, wherein the second indicator indicates to the UE to stop monitoring the SCell for a predefined period of time, and wherein the predefined period of time is one of a plurality of predefined durations.

9. The method of claim 8, wherein the predefined period of time comprises a number of subframes.

10. The method of claim 1, wherein a location of an ending symbol of the ending subframe is indicated by the control information.

11. The method of claim 1, wherein a number of OFDM symbols comprised in the ending subframe is indicated by the control information.

12. The method of claim 11, wherein the number of OFDM symbols in the ending subframe is one of 3, 6, 9, 10, 11, 12, and 14.

13. The method of claim 1, wherein the data burst is transmitted utilizing at least one of an initial clear channel assessment (CCA) or an extended CCA (ECCA).

14. A method for subframe configuration, the method comprising:
- transmitting, from a secondary cell (SCell), a first indicator to a first user equipment (UE) instructing the first UE to monitor the SCell;
- transmitting, from the SCell, control information in a subframe of a data burst to the first UE, the data burst including a plurality of subframes and ending with an ending subframe, wherein the control information indicates whether the subframe is the ending subframe in the data burst or another subframe in the data burst, and the control information includes a field that indicates a duration of the subframe as a number of occupied orthogonal frequency-division multiplexing (OFDM) symbols; and
- transmitting, from the SCell, a second indicator to the first UE instructing the first UE to stop monitoring the SCell during a subframe in which the SCell remains activated and performs transmissions, the SCell continuing to be monitored by at least a second UE after the first UE stops monitoring the SCell.

15. The method of claim 14, wherein the control information is included in downlink control information (DCI) of a physical downlink control channel (PDCCH).

16. The method of claim 14, wherein the ending subframe in the data burst is one of a full ending subframe and a partial ending subframe, wherein the full ending subframe comprises a predefined number of OFDM symbols and the partial ending subframe comprises a fraction of the predefined number of OFDM symbols.

17. The method of claim 16, wherein the partial ending subframe uses a time slot structure in a time division duplexing (TDD) scheme, and wherein the time slot structure is downlink pilot time slots (DwPTS).

18. The method of claim 14, wherein for a second subframe without the control information indicating the second subframe as an ending subframe and a duration of the ending subframe, the second subframe is interpreted as a non-ending subframe in the data burst.

19. The method of claim 14, wherein the control information is transmitted to a group of UEs.

20. The method of claim 14, wherein instructing the first UE to monitor the SCell comprises instructing the first UE to start monitoring a channel for a reference signal (RS)/(enhanced) physical downlink control channel ((E)PDCCH) of the SCell.

21. The method of claim 20, wherein the SCell is an evolved NodeB (eNB).

22. The method of claim 14, wherein a location of an ending symbol of the ending subframe is indicated by the control information.

23. The method of claim 14, wherein a number of OFDM symbols comprised in the ending subframe is indicated by the control information.

24. The method of claim 23, wherein the number of OFDM symbols comprised in the ending subframe is one of 3, 6, 9, 10, 11, 12, and 14.

25. The method of claim 14, wherein the data burst is transmitted utilizing at least one of an initial clear channel assessment (CCA) or an extended CCA (ECCA).

26. A user equipment (UE) configured for wireless communications, the UE comprising:
- a non-transitory memory storage comprising instructions; and
- one or more processors in communication with the non-transitory memory storage, wherein the one or more processors execute the instructions to:
  receive a first indicator from a secondary cell (SCell), and based thereon, starting to monitor the SCell;
  - receive, control information in a subframe of a data burst from the SCell of the UE, the data burst including a plurality of subframes and ending with an ending subframe, wherein the control information indicates whether the subframe is the ending subframe in the data burst or another subframe in the data burst, and wherein the control information includes a field that indicates a duration of the subframe as a number of occupied orthogonal frequency-division multiplexing (OFDM) symbols; and
  - receive a second indicator from the SCell instructing the UE to stop monitoring the SCell during a subframe in which the SCell remains activated and performs transmissions, and based thereon, ceasing to monitor the SCell during the subframe in which the SCell remains activated and performs.

27. An evolved NodeB (eNB) configured for wireless communications, the eNB comprising:
- a non-transitory memory storage comprising instructions; and
- one or more processors in communication with the non-transitory memory storage, wherein the one or more processors execute the instructions to:
  - transmit a first indicator to a first user equipment (UE) instructing the first UE to monitor the SCell;
  - transmit control information in a subframe of a data burst to the first UE, the data burst including a plurality of subframes and ending with an ending subframe, wherein the control information indicates whether the subframe is the ending subframe in the data burst or another subframe in the data burst, and the control information includes a field that indicates a duration of the subframe as a number of occupied orthogonal frequency-division multiplexing (OFDM) symbols; and
  - transmit a indicator to the first UE instructing the first UE to stop monitoring the SCell during a subframe in which while the SCell remains activated and performs transmissions, the SCell continuing to be monitored by at least a second UE after the first UE stops monitoring the SCell.

* * * * *

UNITED STATES PATENT AND TRADEMARK OFFICE
CERTIFICATE OF CORRECTION

PATENT NO. : 10,674,535 B2
APPLICATION NO. : 15/345235
DATED : June 2, 2020
INVENTOR(S) : Jialing Liu et al.

Page 1 of 1

It is certified that error appears in the above-identified patent and that said Letters Patent is hereby corrected as shown below:

In the Claims

In Column 32, Line 52, Claim 27, delete "while".

Signed and Sealed this
Eighth Day of September, 2020

Andrei Iancu
*Director of the United States Patent and Trademark Office*